United States Patent [19]

Naruse et al.

[11] Patent Number: 4,914,468
[45] Date of Patent: Apr. 3, 1990

[54] LIGHT MEASURING DEVICE

[76] Inventors: Kazuhiko Naruse, 137-banchi, 5-bancho, Suzurandai, Nabari-Shi, Mie-Ken; Yoshio Yuasa, 4-18-3, Fuminosato, Abeno-Ku, Osaka-Shi, Osaka-Fu, both of Japan

[21] Appl. No.: 171,641

[22] Filed: Mar. 22, 1988

Related U.S. Application Data

[63] Continuation of Ser. No. 893,596, Aug. 6, 1986, abandoned.

[30] Foreign Application Priority Data

Aug. 7, 1985 [JP] Japan .................. 60-173819

[51] Int. Cl.⁴ .......................... G03B 15/02; G01J 1/44
[52] U.S. Cl. .................................. 354/415; 354/425;
354/465; 354/127.1; 356/223; 356/229;
356/215; 356/227

[58] Field of Search ................ 354/413, 415, 471–475,
354/127.1, 127.11, 127.12, 425, 465; 356/215,
218, 223, 226, 229, 230

[56] References Cited

U.S. PATENT DOCUMENTS

| 4,291,979 | 9/1981 | Yuasa et al. ..................... 356/215 X |
| 4,367,932 | 1/1983 | Ishikawa et al. ..................... 354/415 |
| 4,373,793 | 2/1983 | Taniguchi et al. .............. 356/215 X |
| 4,460,263 | 7/1984 | Gfeller et al. ................... 354/415 |
| 4,717,934 | 1/1988 | Kobayashi et al. ................. 354/415 |

FOREIGN PATENT DOCUMENTS 53-20323  2/1978  Japan .
56-77725  6/1981  Japan .
59-22498  7/1984  Japan .

Primary Examiner—W. B. Perkey

[57] ABSTRACT

A light measuring device calculates and displays a proper exposure condition even when the combination of shutter speed and aperture is predetermined by using a flashlight component and a measured light data.

9 Claims, 13 Drawing Sheets

Fig. 2b
Fig. 2a
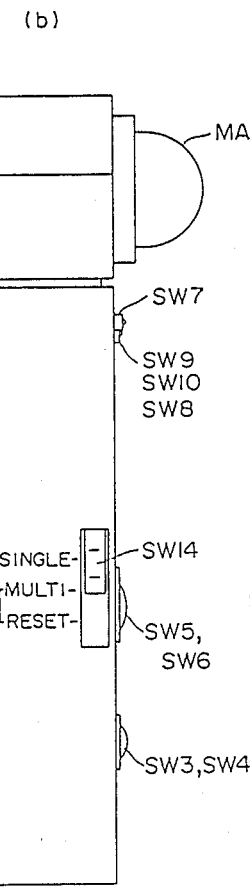
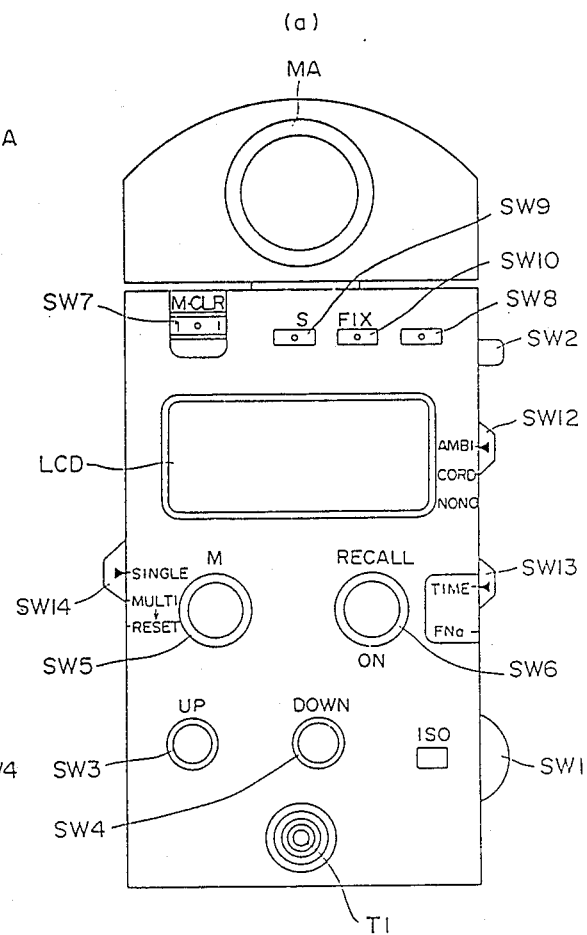

LIGHT MEASURING DEVICE

This is a continuation application of Ser. No. 893,596, filed on Aug. 6, 1986 (now aband.).

BACKGROUND OF THE INVENTION:

1. Field of the Invention

The present invention relates to a device for measuring ambient light or flash light.

2. Description of the Prior Art

There has heretofore been disclosed a light measuring device equipped with a memory for storing two light measurement values in Japanese Patent Laid-Open No. 20323/1978. This light measuring device is constituted so that one light measurement value is obtained by a single measuring operation, and the thus obtained values are stored in the memory in due order. In addition, after the storage has been completed, it is feasible to specify desired light measurement values that are already stored therein. Exposure-calculation is performed on the basis of the specified light measurement values and the calculated result is arranged to be displayed.

A light measuring device disclosed in Japanese Patent Laid-Open No. 77725/1981 subsumes: a memory for storing a plurality of light measurement values; a first display means for lighting up one of the display elements arranged in a predetermined direction in accordance with a stored light measurement value; and a second display means for displaying numerals on the basis of a stored light measurement value. The second display device displays the numerals corresponding to the specified light measurement value among a multiplicity of light measurement values stored in the memory.

In either device, the number of light measurement values allowable to be stored in the memory is determined beforehand and storage capacity is therefore confined. In the above-described conventional devices, the user is unable to ascertain the number of the light measurement values which are now stored in the memory and hence it is impossible to confirm the residual capacity of storage.

In the aforementioned light measuring device disclosed in Japanese Patent Laid-Open No. 77725/1981, a display element corresponding to the stored light measurement value is indicated by the first display means. However, if a plurality of the already stored light measurement values are the same, a plurality of the light measurement values will correspond to one display element, whereby it is unfeasible to ascertain the number of the light measurement values stored in the memory.

There is broadly known a flash light measuring device having a switch turned ON in order to set the device to a condition for measuring a flash light. This kind of device is constituted such that, the switch is turned ON, and after enabling the light measuring device to measure the flash light by turning ON of the switch, the measurement is started by receiving the flash light. In such a constitution, however, at the moment of completing one measurement of light, the reception of the flash light is inhibited. As a result, when measuring the flash light once more, the switch is turned ON again and the flash light must be set in a receivable state. Furthermore, this arrangement virtually requires an operator who manipulates the light measuring device and another operator who manipulates a flash light source.

In regard to a device for measuring a quantity of flash light, a well-known type is the one which is capable of selecting either a single measurement mode or a continuous measurement mode, the former measuring an amount of the light emitted once by a flash device to display it, the latter successively integrating amounts of the light consecutively emitted by the flash device. According to this device, a light measuring circuit, provided for producing an electric signal corresponding to the amount of light received, is set to an operable condition by operation of a predetermined key. Here, the integrated amount in the continuous measurement mode is reset by the operation for permitting a new integration. However, it is impossible to reset the integrated amount in the continuous measurement mode by the operation of the predetermined key in the single measurement mode in which the light measurement is started by the operation.

Additionally, in a flash photographing mode in which an object is photographed by illuminating it by light emitted from a flash device, there is a case in which a shutter speed is determined to a flash synchronization speed while an aperture value is determined in accordance with a depth of field and so on. In such case, the following conventional method is adopted in order to obtain a proper exposure with respect to the object to be photographed. Namely, a proper distance from the flash device to the object should be found out with using the combination of the determined shutter speed and the determined aperture value, with repeating the measurement while varying the distance. However, this conventional method needs a great deal of time until a proper exposure condition is achieved and complicated operations must be repeated.

Furthermore, in a photographic exposure meter, a proper combination of a shutter speed and an exposure value for obtaining a proper exposure is displayed in accordance with the brightness of an object to be photographed or with the luminance thereof. For example, a combination of a preset shutter speed value and a proper aperture value calculated for obtaining a proper exposure is displayed in a shutter speed priority mode, while a combination of a preset aperture value and a proper shutter speed calculated for obtaining a proper exposure is displayed in an aperture priority mode.

However, in such a photographic exposure meter, only a combination of a shutter speed and an exposure value is displayed after a conpletion of light measurement. Therefore, it is difficult to distinguish a preset value from a calculated value in the displayed combination. Additionally, if the newly measured result is the same as that of the previous result, it is not easy to recognize whether the new measurement is virtually effected or not.

SUMMARY OF THE INVENTION

An object of the present invention is to provide a light measuring device which enables a user to easily recognize the number of light measurement values stored in a memory means.

The other object of the present invention is to provide a light measuring device which is capable of making its operation more simple.

Further, another object of the present invention is to provide a light measuring device for measuring flash light in which a manual operation for setting the device to a light measuring condition is not necessary every time a measurement of a single flash light is finished.

Another object of the present invention is to provide a light measuring device for measuring flash light which is capable of selecting either the single measurement mode for measuring a single flash light emission and the continuous measurement mode for integrating the quantity of flash light emission continuously produced, and which is simplified in operation of the continuous measurement mode.

Further, another object of the present invention is to provide a photographic exposure meter capable of easily distinguishing a preset value from a calculated value in a displayed combination, of shutter speed and aperture value.

Further, another object of the present invention is to provide a light measuring device in which a proper exposure condition can be found out more easily even if the combination of shutter speed and aperture value is predetermined.

To accomplish the above-described object, the light measuring device according to the present invention comprises a counting means for counting the number of the light measurement values stored in a memory means and a number display means for performing the display on the basis of the counted values given by the counting means. Hence, the number of the light measurement values stored in the memory means is displayed by the number display means.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIG. 2(a) is a front elevation of an appearance thereof;

FIG. 2(b) is a side view of the appearance thereof;

DETAILED DESCRIPTION OF THE PREFERRED EMBODIMENT

Figure 1:
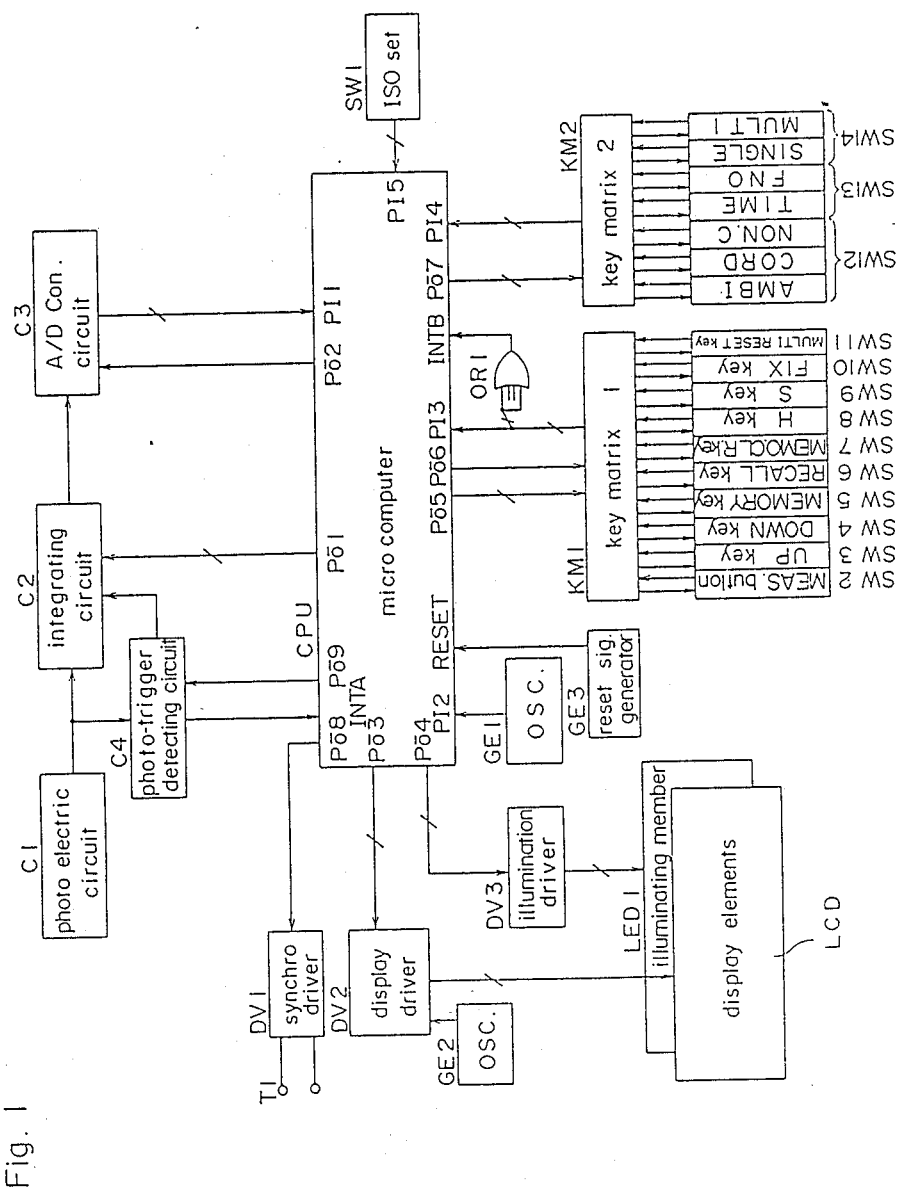
FIG. 1 is a block diagram showing an overall configuration of an embodiment according to the present invention.

FIG. 1 is a block diagram showing a constitution of an embodiment of the present invention. A photoelectric circuit (C1) includes a light receiving elements, an operational amplifier and a logarithmic compression diode. The photoelectric circuit (C1) transfers an electrical signal which is in proportion to a logarithm of an intensity of the incident light on the light receiving element to an integrating circuit (C2) and to a photo-trigger detecting circuit (C4). The photo-trigger circuit (C4) transmits an integration starting signal to the integrating circuit (C2) when pulse-like light is incident on the light receiving element of the photoelectric circuit (C1); and this circuit (C4) also a transmits signal indicating the incidence of the pulse-like light to an input terminal (INTA) of a microcomputer (CPU). The transmission of the integration starting signal to the integration circuit (C2) of the aforementioned photo-trigger detecting circuit (C4) is effective in a case only where a non-cord mode (a mode in which to commence the integration in response to the light emitted by a flash device without using any cord) is set. In other setting modes than this, inhibition is made by a signal sent from an output terminal (PO9) of the microcomputer (CPU).

The above-described integrating circuit (C2) starts to integrate the electrical signal corresponding to the incident light during a gate time set from outside or during a preset time in response to the signal transmitted from the output terminal (PO1) of the microcomputer (CPU) or to the integration starting signal of the photo-trigger detecting circuit (C4). The fact that a line connecting the output terminal (PO1) to the integration circuit (C2) is marked with/indicates that the connecting line is plural. The line marked with/is hereinafter deemed to be plural. The electrical signal integrated by the integration circuit (C2) is converted to a digital signal in an AD conversion circuit (C3) of the next stage in response to a signal sent from an output terminal (PO2) of the microcomputer (CPU). The thus converted digital signal is transferred together with AD conversion terminating signal to an input termianl (PI1) of the microcomputer (CPU).

As for the AD conversion circuit (C3), there are considered a double integration type, a sequential comparative type and so on. These methods are, however, are not directly associated with the present invention and hence detailed descriptions thereof are omitted. That is, such methods can be utilized in the construction while modifying the input and output terminals (PI1), (PO2) of the microcomputer (CPU) and the AD conversion circuit (C3). The microcomputer (CPU) includes a ROM in which programs are stored beforehand, a RAM for temporarily holding data, an accumulator which performs various kinds of calculating operations, a timer 0 which generates signals at the intervals of a given period of time, decoders, output terminals and input terminals.

A reset signal is inputted from a reset signal generator (GE3) to an input terminal (RESET) of the microcomputer (CPU) when electric power is supplied to the device. The microcomputer (CPU) starts executing the program from a predetermined address of the program stored in the ROM. A reference pulse generator (GE1) arranges for oscillation pulses to be inputted to an input terminal (PI2) of the microcomputer (CPU); and the microcumputer (CPU) processes the program according to the oscillation pulses given by the reference pulse generator (GE1) and then counts the oscillation pulses generated by the reference pulse generator (GE1) in the built-in timer 0. In this case, internal interruption is made by the timer 0 at almost regular intervals of time. The interruption by the timer 0 is a well-known fact in the microcomputer which are now available in the market, so that the detailed description pertaining to this is omitted.

A high signal is outputted from an output terminal (PO8) of the microcomputer (CPU) simultaneously when the measurement starts, if a cord mode is set in this embodiment. The High signal outputted from the output terminal (PO8) actuates a synchronization driver (DV1) and further short-circuits a synchronization terminal (T1). An output terminal (PO3) is connected to a display driver (DV2) which drives display elements (LCD). The display driver (DV2) includes a RAM which corresponds to lighting segments of the display elements (LCD). A flicker oscillator (GE2) supplies the display driver (DV2) with flicker pulses and the desired segments of the display elements (LCD) flicks in accordance with the flicker pulses.

Signals are supplied from an output terminal (PO4) of the microcomputer (CPU) to an illumination driver (DV3) according to the program. The illumination driver (DV3) makes a display illumination member (LED1) light up which is disposed on the rear surface of the display elements (LCD) of a semitransparent type. An ISO setting part (SW1) is designed for setting film sensitivity based on the ISO standard by means of an outside dial. The film sensitivity, viz., an ISO value set by the ISO setting part (SW1) is inputted to an input terminal (PI5) of the microcomputer as a code signal corresponding to the ISO value.

A key matrix 1 (KM1) is designed for detecting a state of normally opened switches (SW2) to (SW11). Signals for strobing the switches (SW2), (SW3), (SW4), (SW5), (SW7), (SW8), (SW9), (SW10), (SW11) are outputted from an output terminal (PO5) of the microcomputer (CPU), respectively.

A signal for strobing the switch (SW6) (hereinafter called RECALL key) connected to a RECALL key is outputted from an output terminal (PO6) thereof. An input terminal (P13) is the one to which signals indicating each state of the switches (SW2) to (SW11) are inputted from the key matrix (KM1). Strobe signals outputted from the ouput terminals (PO5), (PO6) are defined as the High signals which sequentially strobe the respective switches in accordance with the program. The High signals are inputted to the input terminal (P13) when the corresponding strobed switches are ON.

The signals inputted to the input terminal (P13) are connected to input terminals of an OR gate (OR1); and an output of the OR gate (OR1) is connected to an input terminal (INTB) of the microcomputer (CPU). Where the program of the microcomputer (CPU) is in a HALT state, and if the High signals are outputted from the output terminals (PO5) and (PO6), the High signal will be inputted to the input terminal (INTB) by turning ON any one of the switches (SW2) to (SW11). The microcomputer (CPU) jumps from the HALT state to a predetermined address of the program and resumes the execution of the program in response to the interruption signal inputted to the input terminal (INTB). The switch (SW2) is the one (hereinafter referred to as a MEASUREMENT button) which is connected to a measurement button. When this MEASUREMENT button (SW2) is turned ON, a series of measuring operations are commenced in accordance with the set measuring mode, or it performs a function to keep measurement circuits (C1), (C2), (C3), (C4) in a measurable state (a flash light standby state in the non-cord measurement mode).

The switch (SW3) (hereinafter referred to as an UP key) is connected to an up-key. The UP key (SW3) is employed for incrementing an FNo value (an aperture value) or TIME value (a shutter speed) which are set in a data select switch (SW13). The switch (SW4) (hereinafter referred to as a DOWN key) is connected to a down-key. The DOWN key (SW4) is designed for decrementing the FNo value or the TIME value set in the data select switch (SW13). The switch (SW5) (hereinafter referred to as a MEMORY key) is connected to a memory key. In response to turning ON of the MEMORY key (SW5), data corresponding to measured value is stored in the predetermined RAM within the microcomputer.

The RECALL key (SW6) is operated for displaying contents which have been displayed on the display elements (LCD) in the case when the display elements (LCD) is being turned OFF. During the turning ON of the display elements (LCD), the data stored with the help of the MEMORY key (SW5) are displayed on the display elements (LCD) while the RECALL key (SW6) is kept ON.

The switch (SW7) (hereinafter referred to as a MEMORY CLEAR key) is connected to a memory clear key. The data stored with the aid of the MEMORY key (SW5) are erased by turning ON of the MEMORY CLEAR key. (SW8) is the normally opened switch (hereinafter referred to as an H key) connected to an H key (an arithmetic key for highlight standard exposure). The switch (SW9) (hereinafter referred to as an S key) is connected to an S key (an arithmetic key for shadow standard exposure). The switch (SW10) (hereinafter referred to as a FIX key) is connected to a FIX key (an arithmetic key for fixing the measurement value). When keeping each of the H key (SW8), the S key (SW9) and the FIX key (SW10) in an ON state, the exposure calculation programmed in correspondence with the switch in ON state is performed; and the result thereof are displayed on the display elements (LCD). The switch (SW11) (hereinafter referred to as a MULTI RESET key) is connected to a MULTI RESET key which is designed for starting a new measurement in continuous measurement mode.

A key matrix (KM2) involves a key matrix circuit for grasping each state of static switches (SW12), (SW13) and (SW14). The strobe signals for the switches (SW12), (SW13) and (SW14) are outputted in time series from an output terminal (PO7) of the microcomputer (CPU). The key matrix (KM2) transfers the signals each corresponding to the states of the switches (SW12), (SW13) and (SW14), respectively, to an input terminal (P14) of the microcomputer (CPU) in accordance with the respective states of the switches (SW12), (SW 13) and (SW14). The switch (SW12) (hereinafter referred to as a setting mode switch) is selectively set at any one of three positions AMBI, CORD, NON.C. If AMBI be selected, the light measuring device performs the measurement of the ambient light. If CORD is selected, the microprosessor (CPU) produces an output signal from its output terminal (PO8) to the synchronization driver (DV1) for emitting flash light from a flash device connected to the synchronization driver (DV1) with a connecting cord, and at the same time, the emitted flash light is measured in the light measuring device. If NON.C is selected, the microprosessor (CPU) is so programmed to start the flash light measurement upon receipt of the flash light emission without connecting to the flash device using a connecting cord.

Figure 3:
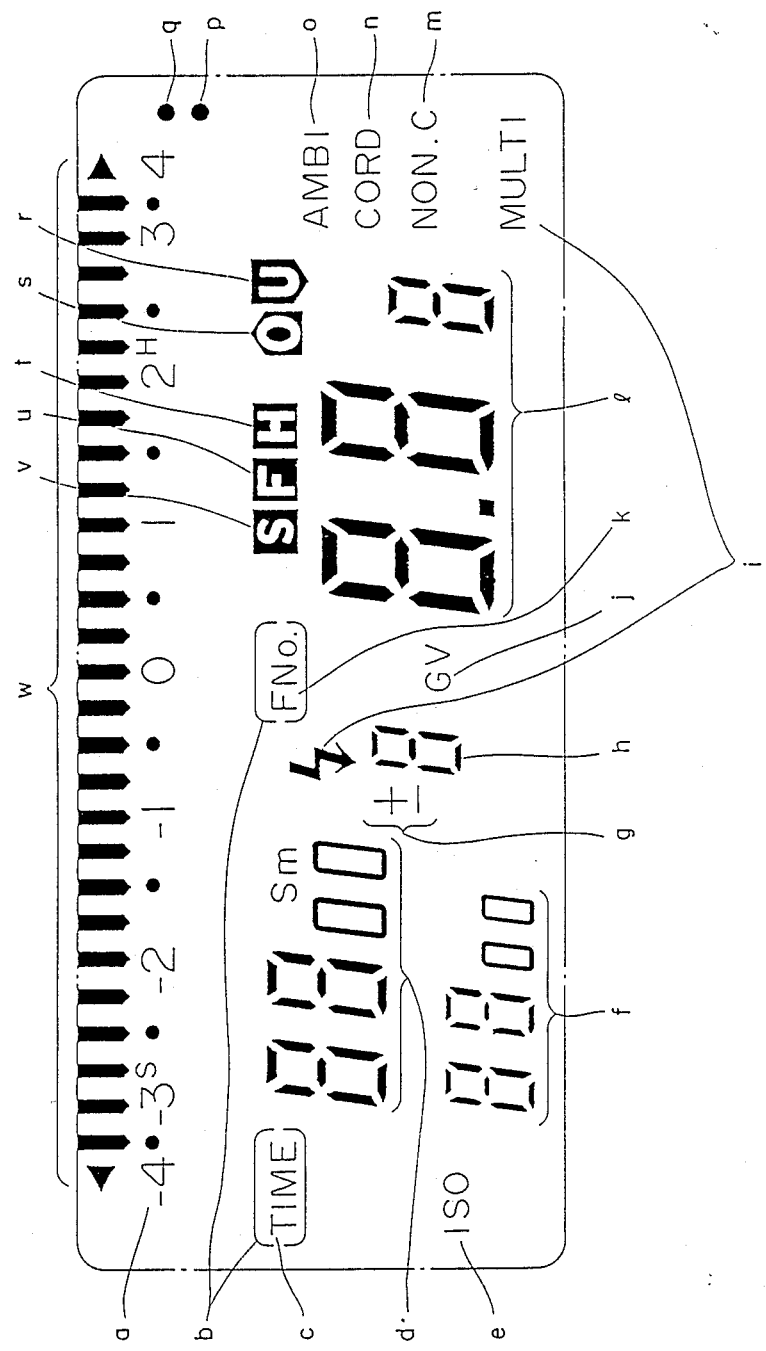
FIG. 3 is an expanded view showing a display mode thereof.

(SW13) is the switch (hereinafter referred to as a TIME/FNO switch) which is selectively set at either TIME or FNO. If TIME is selected, the exposure calculation is performed in shutter speed priority mode in which the proper aperture value is calculated in accordance with a preset shutter speed for a proper exposure. The preset value of the shutter speed displayed on the display elements (LCD) can be changed by the operation of the UP key (SW3) or the DOWN key (SW4) in this mode and perimeter mark (b) around the TIME mark (c) as shown in FIG. 3 on the display elements (LCD) is also indicated in this mode. On the other hand, if the TIME/FNO switch (SW13) is selected at FNO, the preset value of the aperture value displayed on the display elements (LCD) can be changed by the operation of the UP key (SW3) or the DOWN key (SW4). In this case, the proper shutter speed is calculated in the aperture priority mode in accordance with a preset aperture value for a proper exposure. In this aperture priority mode, a mark (b) around the FNo. mark (k) as shown in FIG. 3 is indicated.

(SW14) is the switch (hereinafter referred to as a SINGLE/MULTI switch) which is selectively set at either a position SINGLE or a position MULTI. Where SINGLE is chosen, the single measurement mode is set; while on the other hand, where MULTI is selected, the integrating measurement or the arithmetic measurement relative to the number of integrations is performed.

FIG. 2 is a view showing an appearance of the exposure meter of the embodiment. A light receiving window (MA) is provided at the upper portion of the body. In FIG. 2,a positional relation between the SINGLE/MULTI switch (SW14) and the MULTI RESET key (SW11) is illustrated in the side view (b) of FIG. 2. Only when the SINGLE/MULTI switch (SW14) is set at the position MULTI will the MULTI RESET key (SW11), be allowed to be ON. In the exposure meter according to the present invention, the SINGLE/MULTI switch (SW14) and the MULTI RESET key (SW11) are combined into a single switch. Namely, a position of RESET is provided outside the position MULTI of the SINGLE/MULTI switch (SW14). Therefore, the MULTI RESET key (SW11) is turned ON by pushing further down the switch from the position MULTI. The switch is arranged to spontaneously return to the position MULTI by a spring when the finger is released therefrom.

Figure 4:
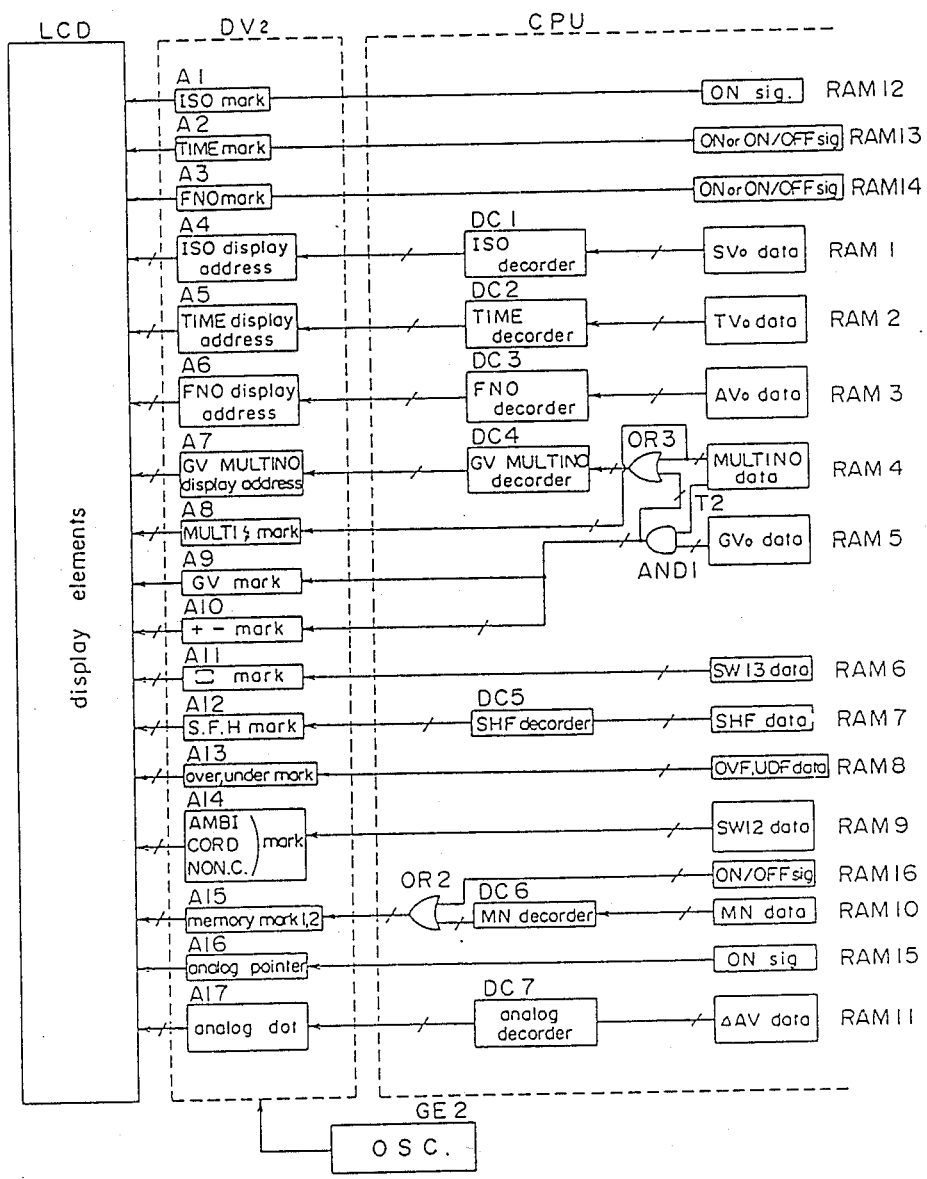
FIG. 4 is a block diagram showing a constitution of a display unit thereof.

FIG. 3 is a view showing a state wherein all the segments of the display elements (LCD) of the exposure meter according to the embodiment are indicated. FIG. 4 is a block diagram which shows the display driver (DV2) for driving the display elements (LCD) and shows the parts relative to the display of the microcomputer (CPU).

The above-described display driver (DV2) falls under a static type in which to effect the outputs corresponding to each of the segments of the display elements (LCD). It is, however, permitted that a dynamic method defined as a drive method based on a common signal is adopted.

The microcomputer (CPU) subsumes a plurality of RAMs (RAM1) to (RAM 16) as shown in FIG. 4 for transferring the display data to the display driver (DV2). The RAM (RAM12) stores data for outputting lighting signal to an address (A1) of the display driver (DV2) in order to indicate an ISO mark (e). The RAM (RAM13) outputs lighting signal or flicker signal to an address (A2) corresponding to the TIME mark (c) of the display driver (DV2). The RAM (RAM14) outputs the lighting signal or the flicker signal to an ddress (A3) coressponding to the FNo mark (k) of the display driver (DV2). The RAM (RAM1) stores a value SVo corresponding to the ISO value set by the aforementioned ISO setting part (SW1), the RAM (RAM1) being connected to an ISO decoder (DC1). The ISO decoder (DC1) decodes the data of the RAM (RAM1) into a code capable of indicating on the display elements (LCD) and then stores the thus decoded code in an ISO display address (A4) of the display driver (DV2). The ISO display address (A4) is connected to an ISO display of the display elements (LCD) and functions so that the values corresponding to SVo data stored in the RAM (RAM1) are displayed.

The RAM (RAM2) stores value TVo corresponding to the shutter speed set with the aid of the UP-key (SW3)or the DOWN-key (SW4) or calculated, this RAM (RAM2) being connected to the TIME decoder (DC2). The TIME decoder (DC2) decodes the data stored in the RAM (RAM2) into a code capable of indicating on the display elements (LCD), and the resultant code is stored in a TIME display address (A5) of the display driver (DV2). The TIME display address (A5) of the display driver (DC2) is connected to a TIME display (d) of the display elements (LCD) and functions so that the value corresponding to TVo data stored in the RAM (RAM2) is displayed. A mark "S" of the TIME display (d) in the display elements (LCD) indicates second. The mark "S" is decoded by the TIME decoder (DC2) to be indicated when the shutter speed ranges from 1 to 59 seconds. A mark "m" of the TIM display (d) likewise indicates minute. The mark "m" is decoded by the TIME decoder (DC2) to be indicated when the shutter speed ranges from 1 to 59 minutes.

The RAM (RAM3) stores the value AVo corresponding to the value FNo set with the help of the UP key (SW3) or the DOWN key (SW4) or to the value FNo obtained by the calculation, this RAM (RAM3) being connected to the FNo value decoder (DC3). The FNo value decoder (DC3) decodes the data stored in the RAM (RAM3) into a code capable of indicating on the display elements (LCD), and thus the decoded code is stored in an FNo value display address (A6) of the display driver (DV3). The FNo value display address (A6) of the display driver (DV3) is connected to an FNo display (f) of the display elements (LCD) and functions so that a value corresponding to data AVo stored in the RAM (RAM3) is displayed. The RAM (RAM4) stores a value MULTI indicating the number of integrating measurements in case of the SINGLE/MULTI switch (SW14) being selected at the position MULTI or the number of multiple exposures calculated, this RAM (RAM4) being connected via the OR gate (OR3) to a GV MULTINO decoder (DC4). The DV MULTINO decoder (DC4) decodes the data stored in the RAM (RAM4) into a code capable of indicating on the display elements (LCD), the resultant code is stored in a GV MULTINO display address (A7) of the display driver (DV2). The GV MULTINO display address (A7) of the display driver (DV2) is connected to a GV MULTINO display (1) of the display elements (LCD) and functions so that values corresponding to data MULTINO stored in the RAM (RAM4) are displayed. Moreover, a part of the data MULTINO of the RAM (RAM4) is transferred to a MULTI mark address (A8) of the display driver (DV2) which address is connected to a MULTI mark (i) of the display elements (LCD), and the MULTI mark (i) of the display driver (DV3) is lit up or flickered. If data except OFF are stored as the data MULTINO of the RAM (RAM4), LOW signal is outputted from a terminal (T2) to control an address (AND1), thereby cutting off the output from the RAM (RAM5) in which data GVo are stored.

When the SINGLE/MULTI switch (SW14) is chosen at the position SINGLE, the data MULTINO become OFF and all the data that are inputted from the RAM (RAM4) to the OR gate (OR3) are changed into LOW signals. On the other hand, a HIGH signal is outputted from the terminal (T2), and the data are inputted from the RAM (RAM5) via an AND gate (AND1) and the OR gate (OR3) to the GV MULTINO decoder (DC4). At the same time, a signal for turning off the indication of the MULTI mark (i) of the display elements (LCD) is inputted to the MULTI mark address (A8) of the display driver (DV2).

The data GVo which are inputted to GV MULTINO decoder (DC4) and are also stored in the RAM (RAM5) are decoded by the GV MULTINO decoder. Thereafter, the GV MULTINO display of the display elements (LCD) is indicated such as to correspond to the GVo data stored in the RAM (RAM5). Simultaneously, the lighting signal or the flicker signal is supplied to a GV mark address of the display driver (DV2); and the lighting signal with + or − mark (g) is supplied to a + − mark address (A10).

If data OFF are stored in the above-described RAMs (RAM1), (RAM2), (RAM3), (RAM4), and (RAM5), inverted signals are transferred from each of the RAMs to the corresponding decoder, and in turn, the individual decoders transfer the turning OFF signals to the display addresses corresponding to the decoders. Setting information of the TIME/ FNo switch (SW13) is stored in the RAM (RAM6) connected to a ○ mark address (A11) of the display driver (DV2) which indicates the ○ mark (b) of the display elements (LCD). When the TIME/FNo switch (SW13) is set at the position TIME, the ○ mark (b) round the TIME mark (c) of the display elements (LCD) is indicated. If FNo is chosen, ○ mark (b) round the FNo mark (k) is indicated. The RAM (RAM7) stores data SHF which are determined when each of the H key (SW8), the S key (SW9) and the FIX key (SW10) is turned ON. The data SHF are decoded by an SHF decoder (DC5) except that the value thereof is zero. The SHF data are stored in an SHF mark address (A12) connected to the SHF mark of the display driver (DV2); and any one of an S mark (v), an H mark (t) and an F mark (u) of the display elements (LCD) is indicated according to the data SHF.

The RAM (RAM8) stores flags of OUF and UDF which are set when the calculated data exceed a display range of the exposure meter of the embodiment. Flicker signal of an over mark (s) or flicker signal of an under mark (r) is given to an over, under mark address (A13) connected to both the over mark (s) and the under mark (r) of the display elements (LCD). The RAM (RAM9) stores a state of the aforementioned setting mode switch (SW12). When the switch (SW12) selects AMBI, a signal for indicating an AMBI mark (o) of the display elements (LCD) is supplied to an AMBI, CORD, NON,C mark address (A14). If the switch (SW12) selects CORD, a signal for indicating a CORD mark (n) is supplied to the address (A14). Furthermore, if the switch (SW12) selects NON.C, a signal for lighting up or flickering a NON.C mark (m) is supplied to the address (A14).

The RAM (RAM16) stores signal for flickering a memory mark 1 (q) or a memory mark 2 (p) of the display elements (LCD). The RAM (RAM10) stores data MN which indicate the number of the stored measurement values. The data MN of the RAM (RAM10) are inputted to an MN decoder (DC6). Where the data MN indicates zero, the memory marks 1 and 2 are not indicated. When the data MN indicates 1, only the memory mark 1 (q) is indicated. When the data MN indicates 2, signals for lighting up the memory marks 1 and 2 are supplied via the OR gate (OR2) to a memory mark 1, 2 address (A15) of the display driver (DV2). When the RECALL key SW6 is turned ON, the RAM (RAM16) supplies flicker information of the memory mark 1 (g) or the memory mark 2 (p) through the OR gate (OR2) to the memory mark 1, 2 address (A15).

The lighting signals are stored in the RAM (RAM15) by executing a display program routine of the program; and an analog pointer address (A16) of the display driver (DV2) lights up an analog pointer of the display elements (LCD) connected thereto. The RAM (RAM11) stores a deviation from a storage value with using the last measured value as a reference, when the S, H, F marks (v), (t), (u) are not indicated. Whereas if either of the S, H, F marks (v), (t), (u) is indicated, the RAM (RAM11) stores the last measurement value and deviation from the last storage value with using the calculated value as a reference. An analog decoder (DC7) decodes the data stored in the RAM (RAM11) so that the reference value corresponds to dots above zero of the analog pointer (w) of the display elements (LCD); and thus decoded data are transferred to an analog dot address (A17) of the display driver (DV2). The analog decoder (DC7), the analog dot address (A17) and the analog dots in the display elements (LCD) are not directly associated with this invention and hence the detailed description thereof is omitted.

When the flicker signals are inputted to the respective addresses (A1) to (A17) of the display driver (DV2), the display driver (DV2) performs a function to supply the display elements (LCD) with signals for flickering the corresponding segments in accordance with the oscillating pulses of the flicker oscillator (GE2). In this embodiment, the microcomputer (CPU) is parallelly connected to each of the addresses of the display driver (DV2). There is, however, considered a method wherein, as serial signals from a serial port, the data are transferred from the microcomputer (CPU) to the individual addresses of the display driver (DV2). The display is herein described such that the display is performed by the decoders or the like constituted within the microcomputer (CPU). However, it is feasible to adopt a method in which the decoding is effected as the program to be stored in the ROM.

Next, the operation of the exposure meter according to the embodiment will hereinafter be described with the reference to the flow charts.

Figure 5:
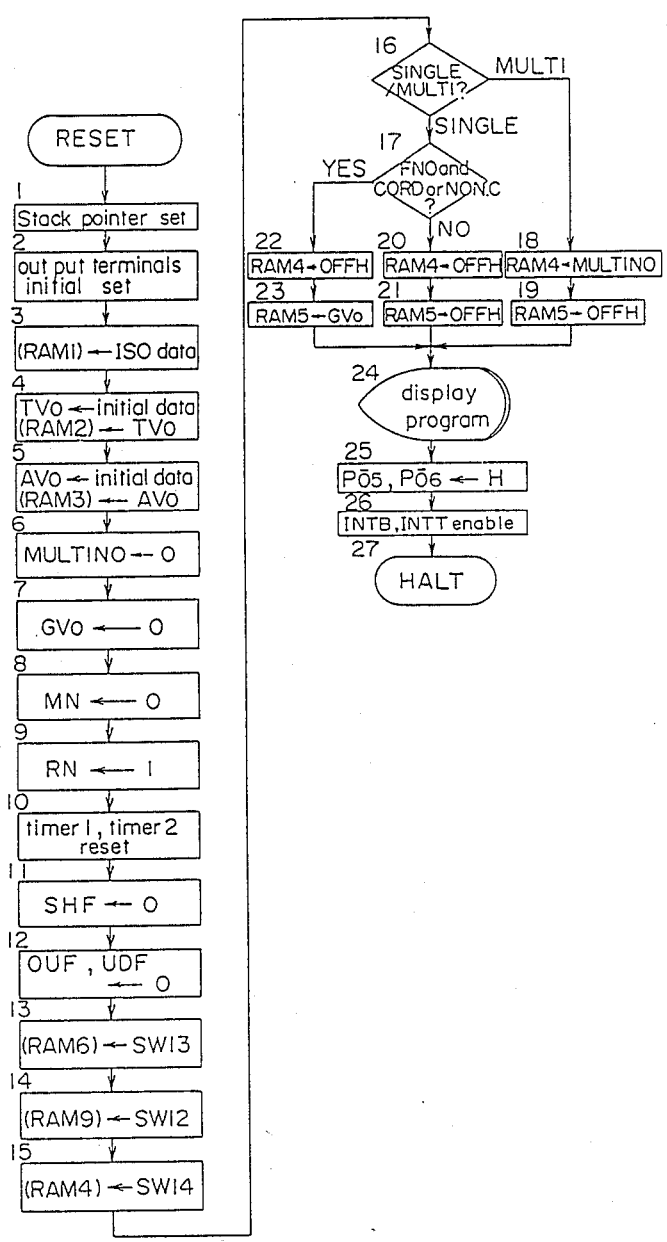
FIGS. 5 to 13 inclusive are flow charts each showing operations thereof.

When each of circuits shown in the block diagram of FIG. 1 is started to be supplied with electric power, a reset signal is inputted, from a reset signal generator (GE3) to an input terminal (RESET) of the microcomputer (CPU). Immediately, the microcomputer (CPU) starts executing the program from the predetermind address of the ROM. FIG. 5 is a flow chart showing the program to be executed when the reset signal is inputted to the input terminal (RESET). In a step 1, a stack pointer provided in the microcomputer (CPU) is set to a predetermined value. In a step 2, individual output terminals of the microcomputer (CPU) are set in an initial state. In a step 3, the ISO value set by the ISO setting part (SW1) are read in code from an input terminal (PI5), and the thus obtained data are stored in the RAM (RAM1). In a step 4, a value corresponding to the preset initial shutter speed value is stored in the RAM which stores the value TVo. Similarly, in step 5, a value corresponding to the preset initial aperture value FNo is stored in the RAM which stores the value AVo. In a step 6, zero is stored in the RAM which stores the value MULTINO which indicates the number of multiple exposures or the number of integrations. In a step 7, zero is likewise stored in the RAM which stores the value GVo indicating an increase or a decrease in quantity of flash light. In a step 8, zero is stored in the RAM which stores the value MN indicating the number of stored measured values. In a step 9, 1 is stored in the RAM which stores the value RN indicating the number of memory which is recalled by operation of the RECALL key (SW6).

In a step 10, the timers 1 and 2 which are respectively employed as a counter for creating a given period of time are reset thereby to start the counting and continue it during the predetermined period of time. In a step 11, a flag SHF is reset to zero, this flag being set by turning ON any one of the H key (SW8), the S key (SW9) and the FIX key (SW10). In a step 12, the flags OUF and UDF are individually set to zero, the flags OUF and UDF being employed for indicating the over mark(s) or the under mark (r) in case that the value calculated after the measurement has been finished exceeds the display range. In a step 13, a setting condition of the TIME/FNo switch (SW13) is stored in the RAM (RAM6). In a step 14, a setting condition of the setting mode switch (SW12) is stored in the RAM (RAM9). In a step 15, a setting condition of the SINGLE/MULTI switch (SW14) is stored in the RAM (RAM20). In a step 16, if the SINGLE/MULTI switch (SW14) be set at SINGLE, the program will proceed to a step 17, and if MULTI be selected, the RAMs (RAM4) and (RAM5) will be set so that the data corresponding to the data MULTINO are displayed on the GV MULTINO display of the display elements (LCD) in steps 18 and 19. If the TIME/FNo switch (SW13) be set at FNo in the step 17 and further setting mode switch (SW12) be set at CORD or NON.C, the process will be jumped to steps 22, 23; and the RAMs (RAM4) and (RAM5) are set so that the data GVo are displayed on the GV MULTINO display of the display elements (LCD). Except for these cases, the program is jumped to steps 20 and 21 where the RAMs (RAM4) and (RAM5) are set so that the GV MULTINO display of the display elements (LCD) is blanked.

Thereafter, the process moves to a display program in a step 24 in which data to be stored in the RAMs (RAM2), (RAM3), (RAM6), (RAM7), (RAM8), (RAM9), (RAM16), (RAM10), (RAM15), (RAM11), (RAM12), (RAM13) and (RAM14) are inputted. With this process, the displays according to each of the switches are performed on the display elements (LCD).

In a step 25, the strobe signals of the keys (SW2) to (SW11) are rendered High. Thus, if any one of the keys (SW2) to (SW11) is turned ON, the High signal is inputted to the input terminal (INTB) of the microcomputer (CPU). In a step 26, an interruption started by an input of High signal to the input terminal((INTB) is permitted. And the other timer interruption, caused by an over flow of the counted value in the timer 0 which counts up the oscillating pulse generated by the oscillator (GE1), is also permitted. In a step 27, the operation of the microcomputer (CPU) is temporarily halted. When either of permissible interruptions are taken place in the step 26, this halt can be released.

FIGS. 6 to 10 inclusive show programs which are to be executed as interruptions when the High signal is inputted to the terminal (INTB) of the microcomputer (CPU). In a step 30, there are inhibited both interruptions which occur by inputting the High signal to the input terminal (INTA) or (INTB) of the microcomputer (CPU) and an interruption caused by the overflow of the internal timer 0. In a step 31, it is judged whether the measurement button (SW2) is ON or not through the key matrix (KM1). When the measurement button (SW2) is OFF, the program is jumped to a step A shown in FIG. 7; whereas if the button (SW2) is ON, a step 32 is carried out. In the step 32, the calculated data differ according to the combinations of conditions of the switches such as the setting mode switch (SW12), the TIME/FNo switch(SW13) and the SINGLE/MULTI switch (SW14). Consequently, the set conditions of the respective switches are detected, and blank data are stored in the RAMs (RAM2), (RAM3), (RAM4), (RAM5) with a view to blanking the displays of the display elements (LCD) which displays correspond to the calculated data.

Table 1 shows the calaulated data, the addresses of the display driver (DV2) and the display contents of the calculated data according to the combinations of conditions of the setting mode switch (SW12), the TIME/FNo switch (SW13) and the SINGLE/MULTI switch (AW14).

The step 32 will be described for exemplification as follows: Where the SINGLE/MULTI switch (SW14) is set at SINGLE; the TIME/FNo switch (AW13) is set at TIME; and the setting mode switch (SW12) is set at CORD, respectively, the data to be calculated are AVo, and the FNo display of the display elements (LCD) is blanked by storing data OFFH in the RAM (RAM3).

Where the SINGLE/MULTI switch (SW14) is set at SINGLE; the TIME/FNo switch (SW13) is set at FNo; and the setting mode switch (SW12) is set at CORD, respectively, the data to be calculated is GVo,and the data OFFH are stored in the RAM (RAM4). Data is stored in the RAM (RAM5) for indicating the GV mark and for blanking the + − mark display and the GV MULTINO display. With this process, the GV MULTINO display (h), the MULTI ƒ mark (i), and the + − mark (g) of the display elements (LCD) are not indicated, whereas the GV mark (j) alone is indicated.

Where the SINGLE/MULTI switch (SW14) is set at MULTI; the TIME/FNo switch (SW13) is set at TIME; and the setting mode switch (SW12) is set at AMBI, respectively, the data to be calculated are MULTINO and AVo. In this case, the data OFFH are stored in the RAM (RAM3), and zero is stored in the RAM (FLASHRAM) which stores the measurement data of flash light. The measuring methods are not directly concerned with the present invention and the detailed description is therefore omitted. If the setting mode switch (SW12) is set at CORD in a step 33, the program is jumped to a step 35, the output terminal (PO8) of the microcomputer (CPU) is rendered High, and the synchronization driver (DV1) is driven to short-circuit the synchronization terminal (T1). In a step 36, the flash light with the ambient light is measured in accordance with the shutter speed set from outside. After this measurement has been effected, the ambient light is measured during the predetermined period of time, and the measured value of the ambient light is stored in a RAM (AMBIRAM). Thereafter, the value of the flash light alone is calculated on the basis of the measured value of the flash light including the ambient light and of the measured value of the ambient light stored in the RAM (AMBIRAM), whereby the resultant value is stored in the RAM (FLASHRAM). The aforementioned measuring method and the method of calculating the value of flash light alone according to the above-described calculation have already been discussed in Japanese Patent Laid-Open No. 10569/1980, so that the detailed description is therefore omitted. In the step 33, where the setting mode switch (SW12) is set at NON.C, the program is jumped to a step 37 in which the signal for flickering a NON.C mark (m) as well as the setting data of the setting mode switch (SW12) are stored in the RAM (RAM9). Owing to this process, the NON.C mark (m) of the display elements (LCD) starts flickering, this means a measurable state (hereinafter referred to as a light standby state) wherein the exposure meter is in condition capable of measuring the intensity of flash light. In a step 58, the High signals are outputted from the output terminals (PO5) and (PO6). In a step 38, the timer 1 for measuring the time in the above-described light standby state is reset in order to start measuring the time. In a step 39, there are permitted both the interruption caused by inputting the High signals to the input terminals (INTA) and (INTB) of the microcomputer (CPU) and the interruption caused by the overflow of the internal timer 0. In a step 40, the time in the light standby state is measured. During a repeating operation of this step 40, if the High signal is inputted to the input terminal (INTA), viz., when the above-described photo-trigger detecting circuit (C4) detects that the flash light is emitted, the program is moved at a jump to a step 36, a series of the above-mentioned measuring operation is carried out in case of CORD being chosen. In the light standby state of the step 40, when any one of the keys (SW2) to (SW11) is turned ON, the High signal is inputted to the input terminal (INTB), whereby this program is jumped to the step 30. Furthermore, in the light standby state of the step 40, in case the internal timer 0 overflows, the program is jumped to the address prescribed by the interruption so as to execute a program thereof. At this time, the timer 1 is returned after one count has been incremented. Under such circumstances, if the light standby state continues for a given period of time, the process moves to a step 41 in which the interruption caused by inputting the High signals to the, input terminals (INTA) and (INTB) is inhibited. In a step 42, in the RAM (RAM9) is stored a signal for converting a flickering state of the NON.C mark into a lighting state thereof. As described in the step 32, if the data to be calculated are blank, that is, unless even one measurement is effected, data is stored in the RAM for displaying "0" in the display elements (LCD). The NON.C mark (m) is changed from the flickering state into the lighting state, which fact leads to a recognition of releasing the light standby state. After the step 42 has been finished, the program is jumped to a step E.

In the step 34 or 36, upon completion of the measurement according to the setting mode of the setting mode switch (SW 12), the program moves to a step 43 in which the TIME/FNo switch (SW13) is set at the position TIME. In addition, where the SINGLE/MULTI switch (SW14) is set at the position MULTI, the program moves to a step 44 in which to carry out the following calculation.

$$2^{DATA1} = 2^{DATA1} + 2^{DAMBIRAM} \ldots \quad (1)$$

$$DATA1 = \log_2 2^{DATA1} \ldots \quad (2)$$

$$WDATA1 = DATA1 \ldots \quad (2)'$$

$$2^{DATA2} = 2^{DATA2} + 2^{DFLASHRAM} \ldots \quad (3)$$

$$DATA2 = \log_2 2^{DATA2} \ldots \quad (4)$$

$$WDATA2 = DATA2 \ldots \quad (4)'$$

The DATA1 shown in the formula (1) is the integrated value of the measured values of ambient light, and the DATA2 of the formula (3) represents the integrated values of the measured values of flash light alone. Zero is inputted to the DATA1 and the DATA2 prior to the integrating measurement. In the computation based on the formulae (1), (3), there is made a special calculation in which, if the exponent of 2 is zero in 2 terms of power, it is recognized that such terms are deemed to be zero. Similarly, in the formulae (2), (4), a special calculation is made wherein the term of power of 2 on the right side thereof is zero, a value on the left side becomes zero. In a step 54, the integration number MULTINO is incremented by one count. Unless the program is jumped to the step 44, the following substitutions are performed.

$$DATA1 = DAMBIRAM \ldots \quad (5)$$

$$DATA2 = DFLASHRAM \ldots \quad (6)$$

DAMBIRAM shown in the formulae (1), (3), (5), (6) stands for the data stored in AMBIRAM, and DFLASHRAM denotes the data stored in FLASHRAM. In the Figure, the display data indicate WDATA1 and WDATA2, and the display data address shows the RAM in which to store the data WDATA1 and WDATA2. Upon completion of the above-described calculation in a step 46, the calculated data are displayed on the display elements (LCD) in a step 47. During the operation from the step 32 to the step 47, the display corresponding to the data to be calculated is blanked. By virtue of this blank state, it is possible to distinguish the data which would be calculated. In a step 48, it is judged whether the setting mode switch (SW12) is set at the position NON.C or not. If selected, the program is jumped to a step 37 wherein a measurement loop issued when the setting mode is NON.C is repeated, thereby reaching the light standby state.

If NON.C is not selected in the step 48, after confirming the measurement button (SW2) is OFF in a step 49, the timer 2 for measuring the time necessary for blanking all the displays in a step 50 is reset to newly start measuring the time required for blanking all the displays. In a step 51, the output terminals (PO5) and (PO6) are rendered High in order that the High signals are inputted to the input terminal (INTB) when any one of the keys (SW2) to (SW11) is ON. In a step 52, there are permitted both the interruption caused in the input terminal (INTB) and the interruption casued by the overflow of the internal timer 0. In a step 53, the program is temporarily halted.

Figure 6:
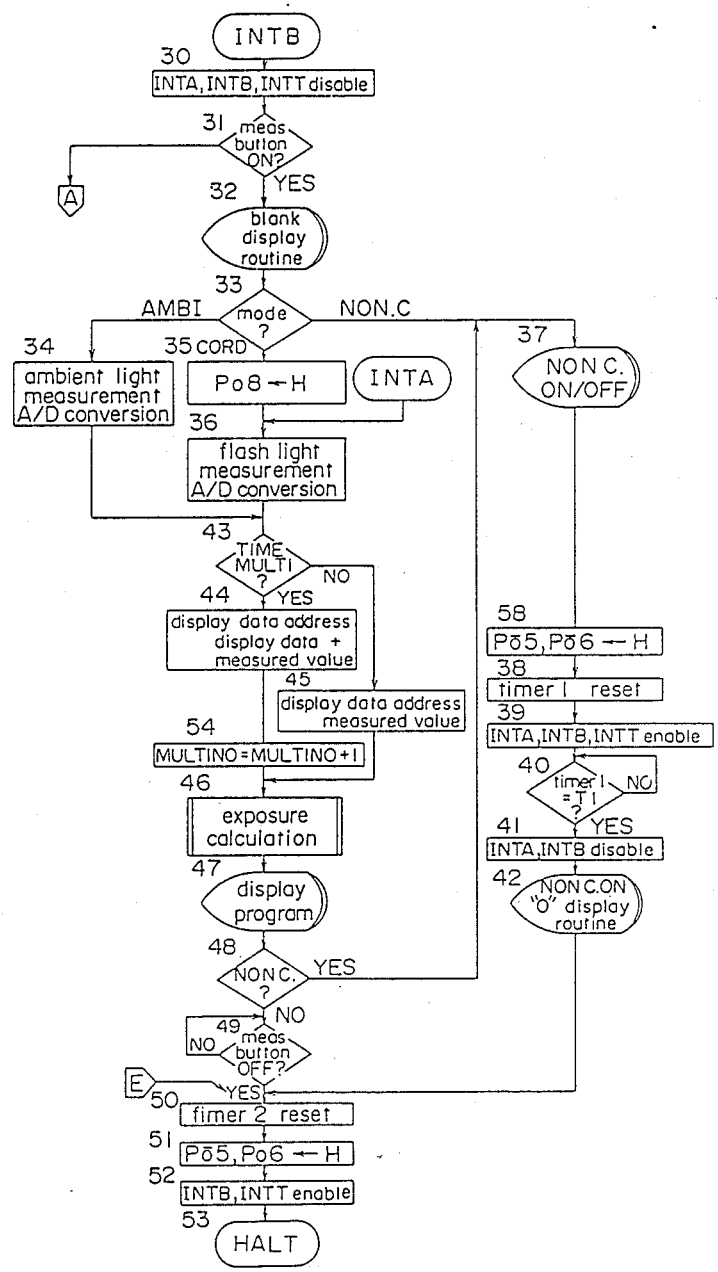
Figure 7:
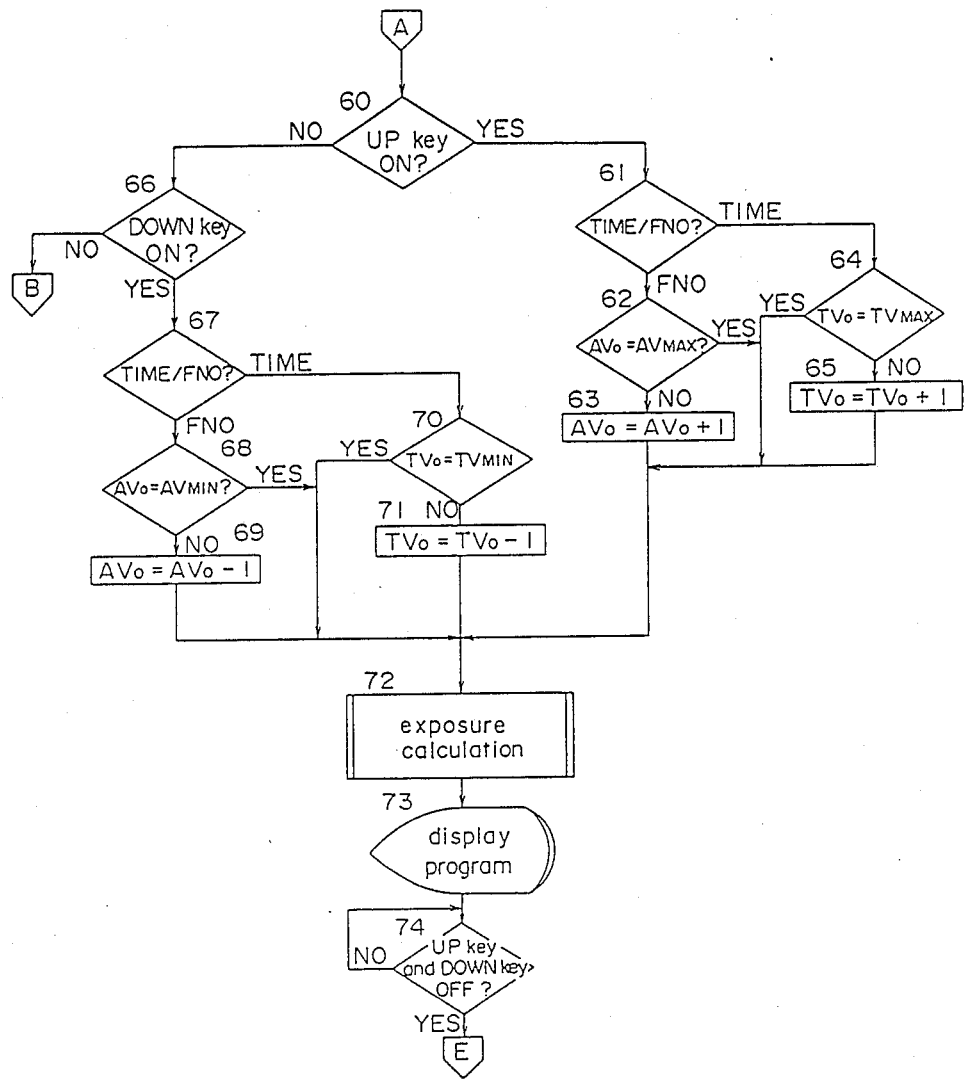

If it is confirmed that the measurement button (SW2) is not ON in the step 31 of FIG. 6, the program is jumped to the step A of FIG. 7. A step 60 necessitates a judgement as to whether the abovementioned UP-key (SW3) is ON or not, which judgement is made by supplying the strobe signal to the key matrix 1 (KM1). If the UP-key (SW3) is ON, the program is moved at a jump to a step 61 wherein it is judged whether or not the TIME/FNo switch (SW13) selects either TIME or FNo. If TIME is chosen, the program moves to a step 64 in which a value TVMAX determined by the display range of shutter speed of the exposure meter is compared with the value TVo corresponding to the preset shutter speed. If these values are equal, no action is made. Thereafter, the program is jumped to a step 72. If the value TVo is unequal to the value TVMAX in the step 64, the value TVo is inevitably less than the value TVMAX. Then, the program is moved to a step 65 in which the value TVo is incremented by one count. This means that the shutter speed is shifted by 1TV to the side of high speed. The value TVo herein denotes the logarithmic value of the inverse number of the shutter speed, the base of which is 2. The program is then moved to a step 72. If the TIME/FNo switch (SW13) selects FNo in the step 61, the value AVMAX determined by the display range of an aperture value of the exposure meter is compared with a value AVo corresponding to the preset value FNo in a step 62. If these values are equal to each other, an operation is executed and the program is then moved at a jump to a step 72. In case that the value AVo is unequal to the value AVMAX in the step 62, the value AVo is always less than the value AVMAX. At this time, the program moves to a step 63 wherein the value AVo is incremented by one count. This means that the value FNo is shifted by one step in the stopping down direction. Thereafter, the program is moved to the step 72 in which the exposure-calculation is made with respect to the modified value TVo or the modified value AVo. The displays which correspond to the calculated data and the modified value TVo or the modified value AVo are executed in a step 73. In a step 74, the program is jumped to the step E, viz., the above-described step 50 after confirming the OFF states of the UP key (SW3) and the DOWN key (SW4) are OFF. After post-processing has been carried out, the program is temporarily halted. In the aforementioned step 60, if the UP key (SW3) is not ON, the program moves to step 66 in which it is judged whether the DOWN key (SW4) is ON or not. When the DOWN key (SW4) is ON, the program moves to a step 67 wherein it is needed to ascertain which is selected, TIME or FNo, by the TIME/FNo switch (SW13) through the intermediary of the key matrix 2 (KM2). If TIME is chosen, the program is jumped to a step 70 in which a value TVMIN determined by the display range of shutter speed of the exposure meter is compared with the preset value TVO. If they are equal to each other, no action is made and hence the program is moved to a step 72. When the value TVO is unequal to the value TVMIN in the step 70, the value TVO is inevitably larger than the value TVMIN; and the value TVO is decremented by one count in a step 71. In the exposure meter, this involves that the shutter speed is shifted by 1TV in the slow-down direction. Thereafter, the program moves to the step 72. If the TIME/FNo switch (SW13) selects FNo in the step 67, the program moves to a step 68 in which the value AVMIN determined by the display range of the value FNo of the exposure meter is compared with the preset value AVo. If equal, the program moves to the step 72. If unequal, the value AVo inevitably exceeds the value AVMIN; and the value AVo is decremented by one ,count in a step 69. In the exposure meter, this means that the value FNo is shifted by one step to the open side. Thereafter, the program moves to the step 72 in which the operations that are mentioned after the step-72 are executed and the program is temporarily halted.

Figure 8:
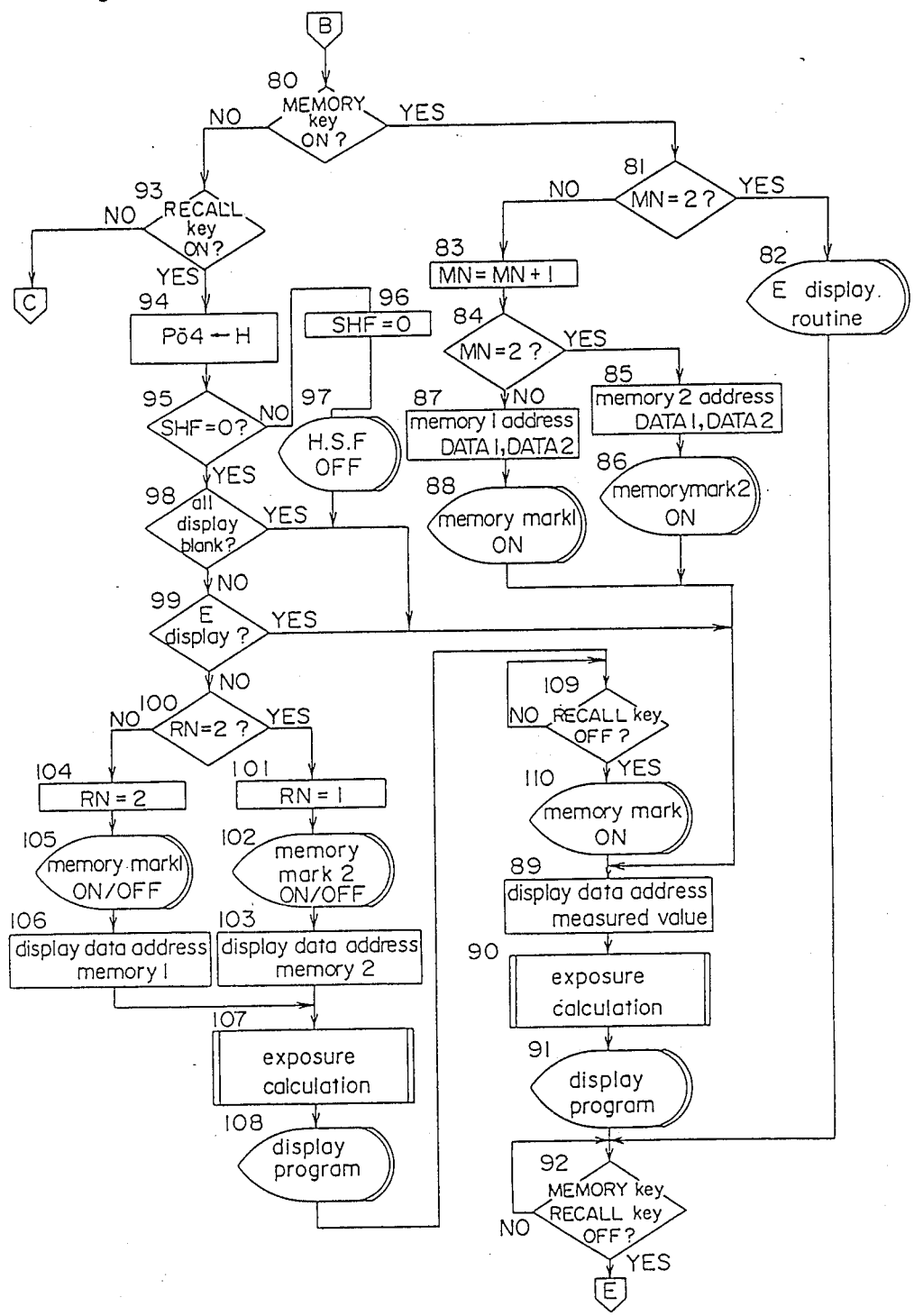

If the DOWN key (SW4) is not ON in the step 66. the process is jumped to a step B of FIG. 8. The step B is led to a step 80 in which there is made a decision as to whether the MEMORY key (SW5) is ON or not with the help of the key matrix 1 (KM1). Where the MEMORY key (SW5) is ON, the process is jumped to a step 81 in which there is effected a judgement as to whether a value of MN indicating the number of data stored is 2 or not. If Mn is 2, that is, when two data are already stored, the process is jumped to a step 82 wherein, a value corresponding to a display E is stored in the display RAM so that a display of the display elements (LCD) becomes the display E. After this, the program is moved to a step 92. If MN is not 2 in the step 81, the process is jumped to a step 83 in which MN is incremented by one count only. In a step 84, it is required to judge as to whether MN is 2 or not. If MN is 2, the program moves to a step 85. At this time, in such a state that one data is already stored as the first memory, the other data is stored as the second memory and it is therefore exhibited that the memory key (SW5) is ON. In the step 85, data DATA1, DATA2 obtained by measurement are stored in the RAM in which to store the data as the second memory. In a step 86, for the purpose of lighting up the memory mark 2 (g) showing that the second memory of data has been completed, the data MN are stored in the display RAM (RAM10), whereby the memory mark (g) within the display elements (LCD) is indicated. At this time, the storage of the first memory is already executed. As a result, the memory marks 1(p), 2(g) are indicated. Where MN is not 2 in the step 84, viz., when the memory key (SW5) is ON in such a state that a single data has not so far been stored as the memory, the program moves to a step 87. In this step, the data DATA1, DATA2 acquired by measurment are stored in the RAM in which to store the first memory. In a step 88, with the intention of indicating the memory mark (p) indicating that the storage of the first memory is executed, the data MN is stored in the RAM (RAM10). From the steps 86 and 88, the program is moved to steps 89 and 90 wherein the exposure-calculation corresponding to the finally measured value is effected. Then, the value calculated in a step 91 is displayed on the display elements (LCD), and it is required to confirm that the MEMORY key (SW5) and the RECALL key (SW6) are OFF. Thereafter, the program is jumped to the step E in which the aforementioned post-processing is effected and the program is then temporarily halted. If the MEMORY key (SW5) is not ON in the step 80, the program is jumped to a step 93 in which there is effected an judgement as to whether the RECALL key (SW6) is ON or not through the intermediary of the key matrix 1 (KM1). If this key is turned ON, the program is moved at a jump to a step 94. Whereas if the key (SW6) is not ON, the program moved to a step C. In the step 94, the High signal is outputted to the output terminal (PO4), thereby lighting up the display illumination member (LED1) provided on the rear surface of the display elements (LCD). In a step 95, it is needed to judge as to whether or not the flag SHF is reset to be zero, this flag SHF indicating whether the exposure-calculation made by keeping each of the H key (SW8), the S key (SW9), the FIX key (SW10) in the ON state is executed or not. If the flag SHF is not zero, viz., when the above-mentioned exposure-calculation is being executed with keeping ON of any one of the keys (SW8), (SW9) and (SW10), the flag SHF becomes zero in the step 96 to release this exposure-calculation. Then, the data SHF are stored in the RAM (RAM7) in order to extinguish the H mark (t), the S mark (v), the F mark (u) within the display elements (LCD) in a step 97. With this process, the exposure-calculation is released. The program is then jumped to a step 89 in which the exposure-calculation and the related display are executed with respect to the finally measured value. In case of the flag SHF being zero in the step 95, that is, when the exposure-calculation with keeping ON of any one of the keys (SW8), (SW9) and (SW10) is not effected, this requires a judgement as to whether all the segments of the display elements (LCD) are in a state of extinction or not in a step 98. The exposure meter arranges for the displays to be automatically extinguished, if the keys (SW2) to (SW11) are not manipulated for a given period of time, to be specific, for instance, four minutes. In such a state, the exposure meter is activated by getting the recall key (SW6) in the ON state. In a step 98, if the extiction of all the displays can be confirmed. The program is jumped to the step 89 in which there are displayed the result of the exposure-calculation relative to the finaly measured value, the calculated data and the set data; and simultaneously the exposure meter of this embodiment is activated. If all the displays are not in a state of extinction in the step 98, the program moves at a jump to a step 99 wherein there is made a decision as to whether the display corresponding to the data shown in Table 1 becomes E or not. This step is provided for releasing the display E executed in response to the turning ON of the MEMORY key (SW5) if two pieces of data have been already stored. If the display is deemed to be E in the step 99, the program is jumped to the step 89 in which the exposure-calculation and the related display are executed with respect to the finally measured value. If it is decided that the display is not E in the step 99, it is necessary to confirm whether the memory to be called involves the first one or the second one in a step 100. When the data RN is 1, the first memory is to be involved; and on the other hand, if the data RN is 2, the second memory is to be called. In case the data RN is 2 in the step 100, the program is jumped to a step 101 in which the data RN is arranged to be 1. By virtue of the operations of a step 104 as well as of the step 101, the first memory and the second memory are alternately called by turning ON the RECALL key (SW6). In a step 102, the second memory is called and hence the memory mark 2 (g) starts flickering by storing the signal in the RAM (RAM16) which signal is employed for flickering the memory mark (g) on the display. In steps 103 and 107, the exposure-calculation is effected on the data stored in the second memory, and the calculated data are displayed in a step 108.

Unless any data are not stored in the first and second memories, data 0 is stored in the RAM in which to store the first memory or the second memory. At this time, 0 is displayed. As a result, it is disclosed that data is not stored in the first memory or the second memory. At the moment of starting the supply of electric power, the data 0 is to be stored in the RAM in which to store the first and second memories. In a step 109, the program is waiting for turning OFF of the RECALL key (SW6). Thereafter, the process is shifted to the next step. A recall-function of the exposure meter of this embodiment remains effective during the ON-state of the recall key (SW6). Immediately when the recall key (SW6) is turned OFF, there is performed a display corresponding to the finally measured value.

In a step 110, the data for indicating the memory mark corresponding to the recalled memory is stored in the RAM (RAM16). In the steps 89 and 90, the exposure-calculations are made with respect to the finally measured value; and the display is carried out in the step 91. If the data RN is not 2 in the step 100, in other words, if the data to be called involves the first memory, the program is jumped to a step 104 wherein the data RN is arranged to be 2. Then, signals for flickering the memory mark 1 (p) of the display elements (LCD) which mark corresponds to the first memory to be called are stored in the RAM (RAM16) in a step 105, whereby the memory mark 1 (p) starts flickering. After this step, the data stored in the first memory are used for exposure-calculation in steps 106 and 107, and the thus calculated data are displayed in a step 108. Operations that will hereinafter be performed are the same as those carried out from the step 09 up to this point.

Figure 9:
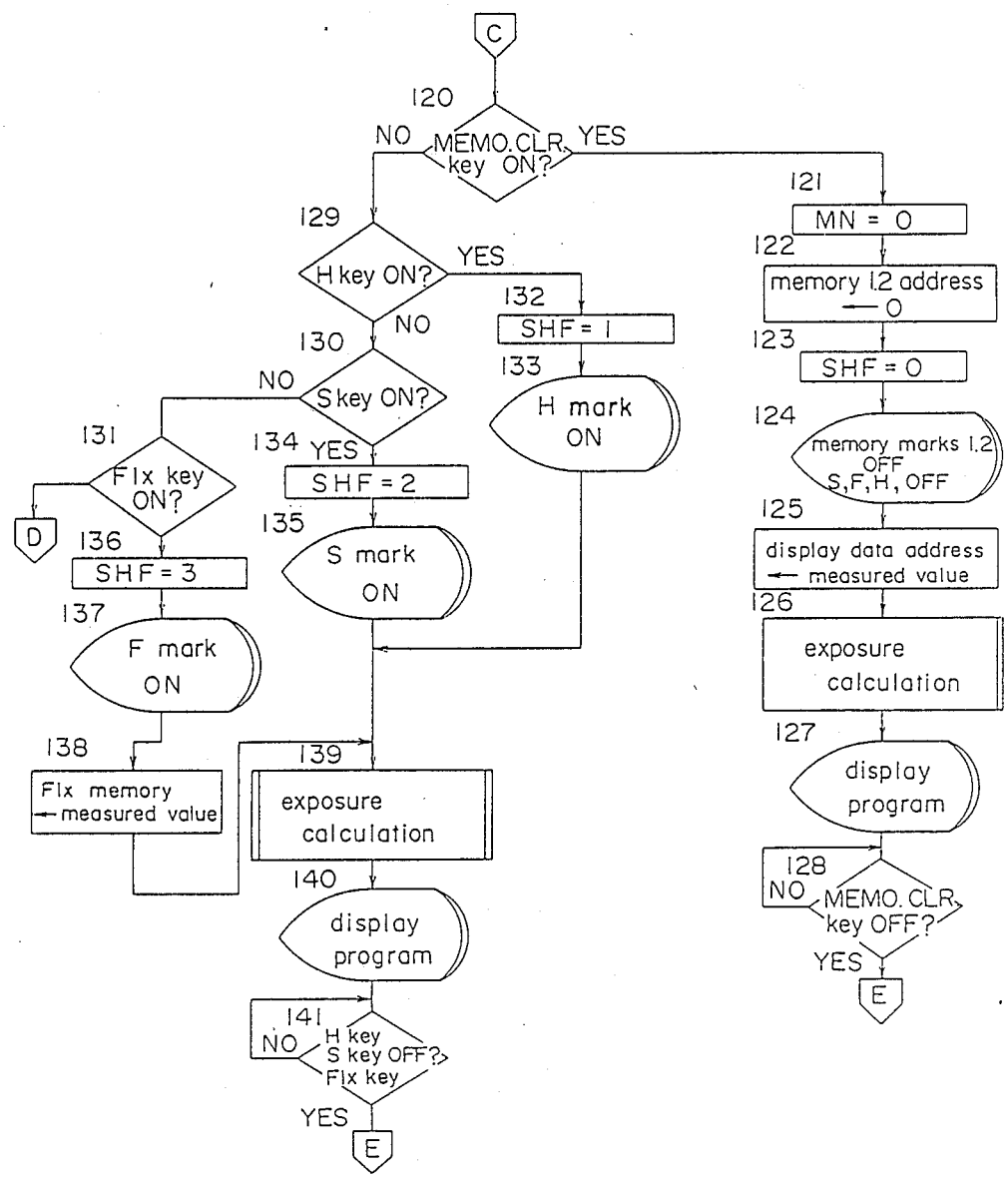

Unless the RECALL key (SW6) is ON in the step 93, the program is jumped to a step C shown in FIG. 9. A step needs to judge as to whether the MEMORY CLEAR key (SW7) is ON or not through the key matrix 1 (KM1). If the MEMORY CLEAR key (SW7) is turned ON, the program is jumped to a step 121. Whereas if this key is not ON, the program is jumped to a step 129.

In the step 121, the data MN which shows the number of memories that are already stored are arranged to be zero. In a step 122, the data 0 are stored in the RAM in which to store the first memory and the second memory. In a step 123, the data SHF are set to 0. In a step 124, the data MN are stored in the RAM (RAM 10). the data MN being employed for extinguishing the memory mark 1 (p) and the memory mark 2 (q) of the display elements (LCD); and in the RAM (RAM7) are stored the data SHF for extinguishing the SHF marks (v), (t), (u). The exposure-calculation according to the condition of the H key (SW8), the S key (SW9) and the FIX key (SW10) is released by turning ON the above-mentioned MEMORY CLEAR key (SW7). In steps 125 and 126, the exposure-calculation is made with respect to the data of the finally measured value, the results are displayed in a step 127. In a step 128, after confirming that the MEMORY CLEAR key (SW7) is OFF, the program is jumped to the step E and is temporarily halted upon the execution of post-processing.

In steps 129, 130 and 131, it is necessary to judge as to whether each of the H key (SW8), the S key (SW9) and the FIX key (SW10) is ON or not. If the H key (SW8) is ON, the the data SHF are set to 1 in a step 132; and the data SHF are stored in the RAM (RAM7) in a step 133 thereby to indicate the H mark (t). If the S key (SW9) is ON in the step 130, the data SHF are set to 2 in a step 134; and the data SHF are stored in the RAM (RAM7) in a step 135, thereby indicating the S mark (V). If the FIX key (SW10) is ON in the step 131, the data SHF are set to 3 in a step 136; and the data SHF are stored in the RAM (RAM7) in a step 137, thereby indicating the F mark (u). In a step 138, the data of measured value are stored in the RAM in which the FIX memory should be stored, in order to fix the measured value in a display condition by turning ON of the FIX key (SW10). Each of the keys (SW8), (SW9) and (SW10) is turned ON in order to execute the exposure-calculation of the step 139, whereby the exposure-calculation is effected. The thus calculated value is displayed in a step 140. In a step 141, it is confirmed that the H key (SW8), the S key (SW9) and the FIX key (SW10) are all OFF, and the program is jumped to the step E. Owing to this process, the post-processing is executed. Thereafter, the program is temporarily halted.

Figure 10:
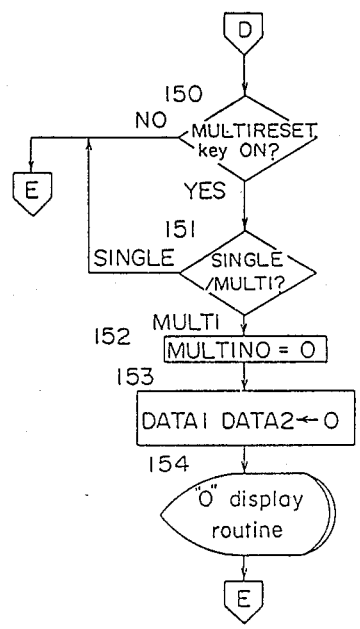

In the steps 129, 130, 131, if it is decided that all of the H key (SW8), the S key (SW9) and the FIX key (SW10) are not ON, the program is jumped to a step D of FIG. 10; and there is made a decision on whether the MULTI RESET key (SW11) is ON or not in a step 150. If it is ON, the program is moved to a step 151; whereas if not, the program is jumped to the step E in which no action is made. After this process, the program is temporarily halted.

The step 151 needs to decide the setting of the SINGLE/MULTI switch (SW14), and if this switch (SW14) selects MULTI, the program is moved to a step 152. In case of SINGLE being chosen, the program is jumped to the step E. The MULTI RESET key (SW11) is effective only when the SINGLE/MULTI switch (SW14) is set at MULTI. In a step 152, MULTINO indicating the number of integrations is set to 0; and both DATA1 and DATA2 each indicating the values integrated are set to 0 in the step 153. In a step 154, GV MULTINO display is set to 0; and the data which is to be calculated as shown in Table when the SINGLE/MULTI switch (SW14) is set at MULTI is 0 in display, viz., in this case, the value of FNo is 0 in display. As a result, the display elements shows that it is possible to newly commence the integrating measurement.

Figure 11:
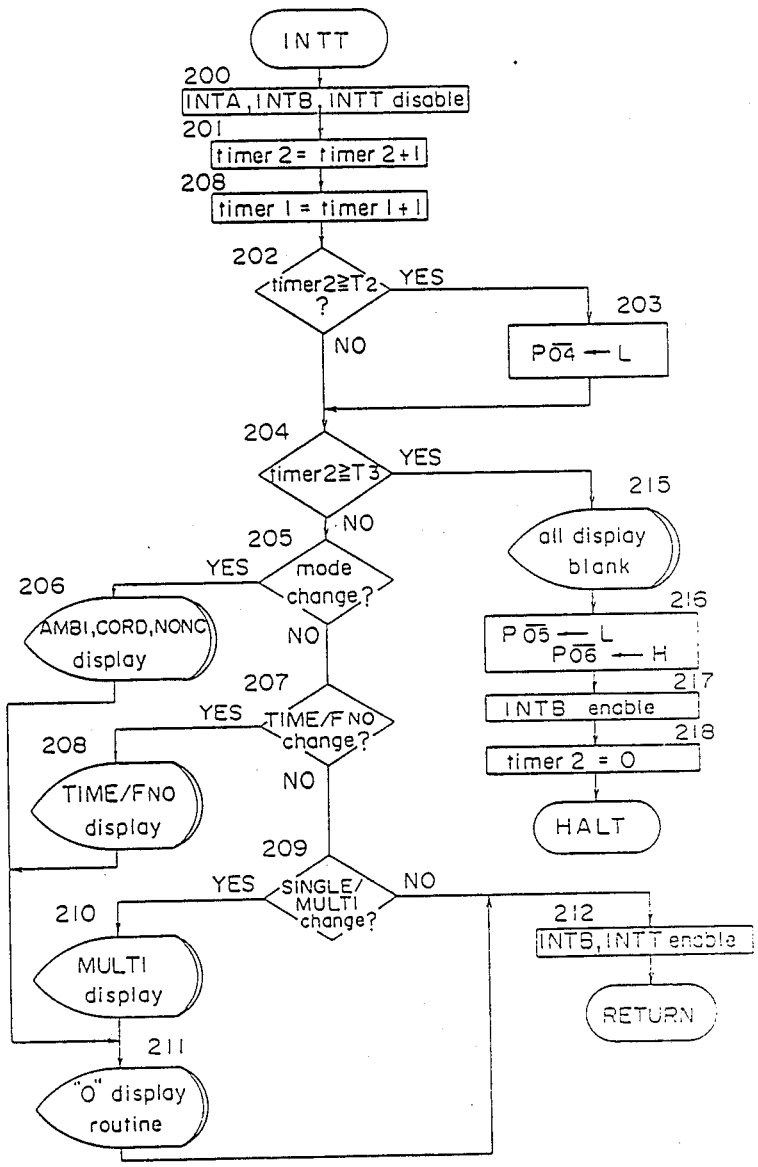

FIG. 11 is a flow chart showing program executed by an interruption caused when the count of the timer 0 provided in the microcomputer (CPU) overflows. However, this program is executable only when this interruption is permitted. In a step 200, the interruption is inhibited; and the timer 2 is incremented by only one count in a step 201. In a step 208, the timer 1 is incremented by only one count. The timer is designed for measuring the time in the light standby state when the setting mode switch (SW12) is set at NON.C. A step 202 needs to judge as to whether a counted value of the timer 2 which is started in the step 201 exceeds a predetermined value $T_2$ or not. In the exposure meter of this embodiment, the value of $T_2$ is set so that the counted value the timer 2 is larger than the value of $T_2$ when, for instance, eight seconds have passed. In the step 202, if the value of the timer 2 is larger than the value of $T_2$, a Low signal is outputted to the output terminal (PO4), whereby the display illumination member (LED1) is in an extinction state. In a step 204, it is necessary to judge as to whether or not the counted value of the timer 2 exceeds a predetermined value $T_3$. In the present exposure meter, the value $T_3$ is set so that the counted value of the timer 2 is more than the value $T_3$, for example, when four minutes have passed. Where the counted value of the timer 2 exceeds the value $T_3$, the program is jumped to a step 215 in which the data for extinguishing all the displays of the display elements (LCD) are stored from the RAM (RAM1) to the RAM (RAM16), thereby extinguishing all the displays thereof.

In a step 216, the Low signal is supplied to the output terminal (PO5), while at the same time the High signal is supplied to the output terminal (PO6). In a step 217, there is permitted the interruption alone which is taken place by inputting a High signal to the input terminal (INTB); and in a step 218, the counted value of the timer 2 is arranged to be zero thereby to temporarily halt the program. With this process, the RECALL key (SW6) alone is supplied with the strobe signals. Hence, in this state, the program which is temporarily halted can be resumed only by placing the RECALL key (SW6) in the ON state. Namely, even if other keys are incautiously turned ON, no operation can be executed.

In a step 204, if the counted value of the timer 2 is less than the value $T_3$, the program moves to a step 205 wherein the condition of the setting mode switch (SW12) is decided to compare it with the previous state. In case that there is a modification in setting of this switch (SW12), the setting data of the switch (SW12) is stored in the RAM (RAM9) in a step 206, thereby modifying the AMBI mark (0), the CORD mark (n) and the NON.C mark (m). Whereas if there is no modification in setting of the switch (SW12), the setting condition of the TIME/FNo switch (SW13) is discriminated in a step 207. Where there exists a modification relative to the previous state, the data of the switch (SW13) are stored in the RAM (RAM6) in a step 208 thereby to execute the modification of mark ⊃ (b) in the display elements (LCD). If no modification is required with respect to the setting of the switch (SW13), the setting condition of the SINGLE/MULTI switch (SW14) is discriminated in a step 209. When there is needed a modification relative to the previous state, the data are stored in the RAMs (RAM4) and (RAM5) so that the mark MULTI, mark ✓ (i), GV mark (j) and + − mark (g) in the display elements (LCD) are displayed in a proper manner in a step 210.

If there is no modification in regard to the respective switches in the steps 205, 207, 209, both the interruption caused by inputting the High signal to the input terminal (INTB) and the interruption which is taken place on account of the overflow of the timer 0 are permitted in a step 212. Thereafter, the program is returned to the address specified before commencing this interruption.

A method of employing the stack pointer in the operation of interruption has not so far been mentioned. However, the method of using the stack pointer is broadly known, but it is not directly associated with the present invention. Therefore, the description is partly omitted.

If any one of the settings condition of the switches (SW12), (SW13) and (SW14) is modified in the steps 205, 207 and 209, after carrying out the operation in regard to the individual displays, the program moves to a step 211. In this step, the data for displaying zero as the data to be calculated in accordance with the setting condition of switches (SW12), (SW13) ad (SW14) are stated in the RAMs (RAM1) to (RAM5). Thereafter, the program moves to a step 212. Then, the conditions of static switches (SW12), (S13) and (SW14) are checked whenever an interruption occurs because of an overflow of the internal timer 0.

Figure 12:
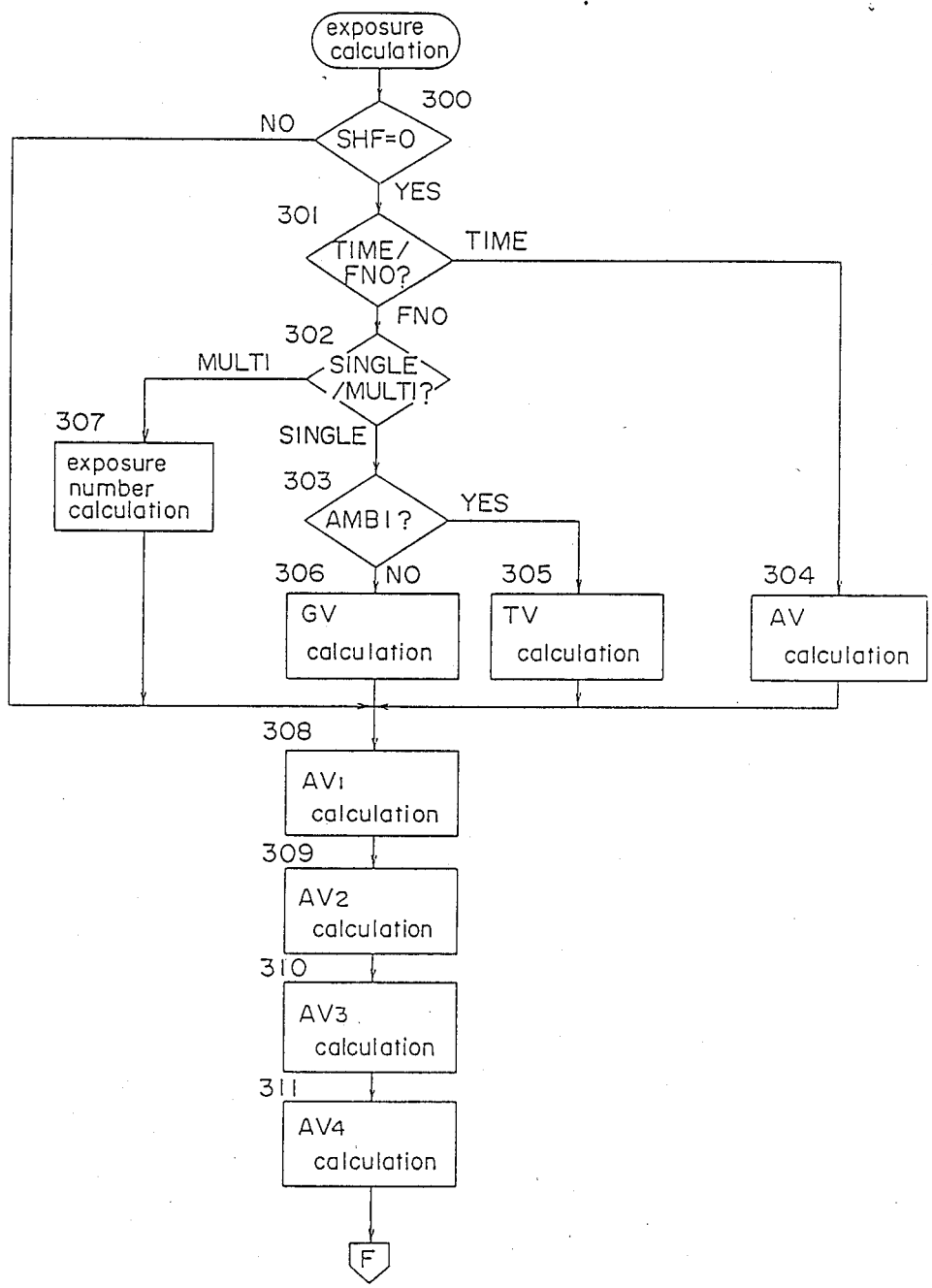
Figure 13:
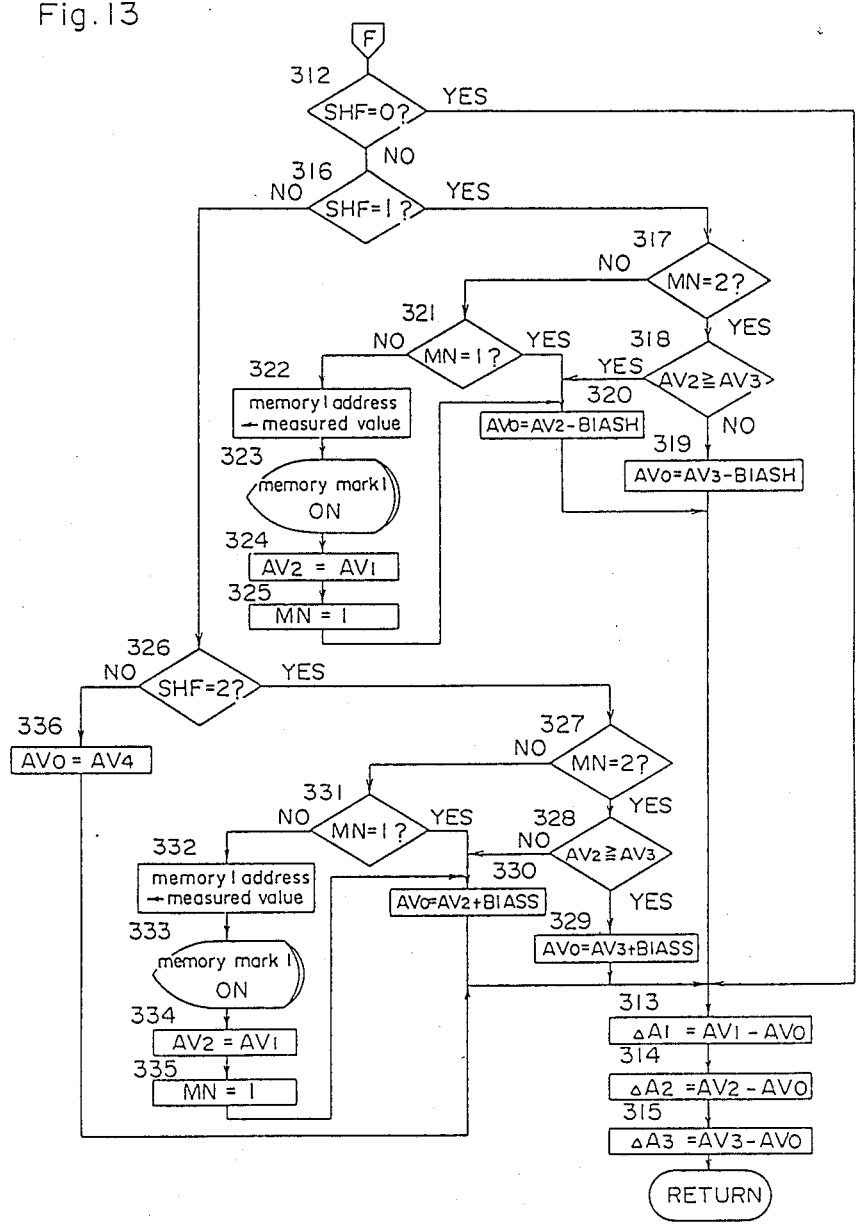

FIGS. 12 and 13 are flow charts each showing the exposure-calculation in the flow chart relative to the input terminal (INTB) illustrated in FIG. 6.

In a step 300 shown in FIG. 12, the data SHF set in accordance with the turning ON of any one of the switches (SW8), (SW9) and (SW10) is checked to be zero or not. If not, the exposure-calculation is effected or has already been effected by turning ON the respective switches (SW8), (SW9) and (SW10). In this case, the program is jumped to a step 308. When the data SHF is zero, the program is moved to a step 301 in which the setting condition of the TIME/FNo switch (SW13) is judged. If this switch (SW13) is set at TIME, the program is jumped to a step 304 wherein an aperture value AV is calculated by making use of the display data, viz., WDATA1, WDATA2. In this case, the following calculations are made.

$$AMB1 = WDATA1 - TVo \ldots \quad (5)$$

$$FLA1 = WDATA2 + GVo \ldots \quad (6)$$

$$2^{AV10} = 2^{AMB1} + 2^{FLA1} \ldots \quad (7)$$

$$AV10 = \log_2 2^{AV10} \ldots \quad (8)$$

$$AVo = AV10 + AVo \ldots \quad (9)$$

WDATA1 in the formula (5) is the brightness value BV under ambient light when the shutter speed is 1 sec., and TVo is the logarithmic value whose base is 2 of the inverse number of the calculated or preset shutter speed. WDATA2 in the formula (6) indicates the brightness value BV under flash light alone. SVo denotes the film sensitivity value SV of ISO sensitivity that is set from outside. The computation of these values have already been fully discussed in Japanese Patent Laid-Open No. 10569/1980. Hence, the detailed description thereof is herein omitted. However, GVo in the formula (6) is the value which shows a degree to which the intensity of the flash light is increased or decreased; and in an ordinary case, 0 is inputted. When WDATA2 shows 0 in the formula (6), that is, if there exists no flash light, whatever the value GVo may be, the calculation is made so that FLA1 becomes 0. In the computation of the formula (7), where the antilogarithm thereof is 0 in the term showing the power of 2, the computation is performed so that the term thereof amounts to 0.

When the value AVo calculated on the basis of only the AV computation of the step 304 exceeds the display range of the value FNo of the exposure meter of this embodiment, the signal for flickering the FNo mark is given to the RAM (RAM14), and at the same time the flag OVF is set. If the value AVo is contrariwise less than the display range, the signal for flickering the FNo mark is also given to the RAM (RAM14), and simultaneously the flag UDF is set. As a matter of course, the flags OVF and UDF are reset within the display range. If FNo is chosen in the step 301, a condition of the SINGLE/MULTI switch (SW14) is judged in the step 302. Where this switch (SW14) is set at MULTI, the number of exposures necessary for satisfying both the predetermined shutter speed and the value FNo is computed in the step 307. The following calculations are therefore carried out.

$$AV10 = AVo - SVo \quad (10)$$

$$AMB1 = WDATA1 - TVo \quad (11)$$

$$FLA_1 = WDATA2 \quad (12)$$

$$MULTINO' = \frac{2^{AV10}}{2^{AMB1} + 2^{FLA1}} \quad (13)$$

$$MULTINO = INT(MULTINO') \quad (14)$$

IF $MULTINO' \neq MULTINO$, $MULTINO = MULTINO + 1$ $$2^{AV10} = (MULTINO) \times (2^{AMB1} + 2^{FLA1}). \quad (15)$$

$$AV10 = \log_2 2^{AV10} \quad (16)$$

$$AVo = AV10 + SVo \quad (17)$$

In the formula (10), AVo is the aperture value AV which corresponds to the preset F-number FNo. The brightness under the ambient light is measured at the preset shutter speed in the formula (11), and the expression (12) is merely the substitution thereof. The denominator of the formula (13) is the linear quantity of the brightness of the light into which the ambient light and the flash light are combined, such brightness being obtained by a single exposure at the preset shutter speed. Then, the data MULTINO', relating to the number of exposures, is computed for taking a photograph at the value FNo which is set by the formula (13). The data MULTINO', however, include a decimal part. In contrast, the number of exposures is an integer and hence the integer part alone of the data MULTINO' is defined as the data MULTINO in the formula (14). If the data MULTINO' be equal to the data MULTINO, viz., when the decimal part of the data MULTINO' is 0, the value FNo to be displayed is the value FNo corresponding to the set aperture value AVo. However, if the data MULTINO' is unequal to the data MULTINO, there is lack of exposure in taking a photograph at the value FNo corresponding to AVo in case of MULTINO-fold exposures. For this reason, the formulae (15), (16), (17) are performed by increasing the data MULTINO by one count; and the value AV in the MULTINO-fold exposures is calculated in order that the resultant value is displayed. Namely, the set value FNo with a fraction is displayed. In this case, IF the data MULTINO is 1 or less, the signal for flickering the MULTI mark is added to the extinction signal of the MULTINO display and is then stored in the RAM (RAM4). Concomitantly, the flag OVF is set, inasmuch as the measured light is too bright. When the data MULTINO is 10 or more, the signal for flickering the MULTI mark is added to the extinction signal of the MULTINO display and is then stored in the RAM (RAM4). Since the measured light is too dark unlike the former, the flag UDF is set. As a matter of course, when the data MULTINO falls under a range of 1 to 9, the flags OVF and UDF are reset.

If the switch (SW14) is set at SINGLE in a step 302, the program is moved to a step 303 wherein a setting condition of the setting mode switch (SW12) is judged. On the occasion when AMBI is chosen, the program is moved to a step 306.

In the step 305, the shutter speed which satisfies the preset value FNo is computed as follows:

$$AV10 = AVo - SVo \ldots \quad (18)$$

$$TVo = WDATA1 - AV10 \ldots \quad (19)$$

Each of the formulae (18), (19) is of an ordinary type of APEX calculation. WDATA1 subsuming a decimal part indicates the brightness of the ambient light at a shutter speed of 1 sec. Accordingly, TVo of the expression (19) also subsumes a decimal part which is displayed as a fraction of the preset value FNo. If TVo exceeds the display range of shutter speed of the exposure meter, the signal for flickering the TIME mark is set in the RAM (RAM13), and at the same time the flag OVF is set, inasmuch as the measured light is too bright. On the contrary, if a shutter speed less than the display range is exhibited, the signal for flickering the TIME mark is set in the RAM (RAM13). Simultaneously, the flag UDF is set, as the measured light is too dark. Within the display range, the flags OVF and UDF are reset, in which case the RAMs (RAM4) and (RAM5) are set so that the GV MULTINO display is extinguished.

In a step 306, with a view to obtaining a proper exposure at the set shutter speed and the set value FNo, a degree to which the level of the required flash light is increased or decreased with respect to the measured flash light is calculated and displayed in the form of GV.

$$AV10 = AVo - SVo \ldots \quad (20)$$

$$TV1 = WDATA1 - AV10 \ldots \quad (21)$$

$$\text{If } TV1 = TVo, \ TVo = TV1 + 1 \ldots \quad (22)$$

$$\text{Save for this, } TVo = TVo \ldots \quad (23)$$

$$AV20 = WDATA1 - TVo \ldots \quad (24)$$

$$2^{AV30} = 2^{AV10_2} \, 2^{AV20} \ldots \quad (25)$$

$$AV30 = \log_2 2^{AV30} \ldots \quad (26)$$

$$GVo' = AV30 - WDATA12 \ldots \quad (27)$$

$$GVo = INT(GVo') \ldots \quad (28)$$

$$\text{If } GVo' \neq GVo \text{ and } GVo \geq 0, \ GVo = GVo + 1 \ldots \quad (29)$$

$$\text{Except this, } GVo = GVo \ldots \quad (30)$$

$$AMB1 = WDATA1 - TVo \ldots \quad (31)$$

$$FLA1 = WDATA12 + GVo \ldots \quad (32)$$

$$2^{AV10} = 2^{AMB1} + 2^{FLA1} \ldots \quad (33)$$

$$AV10 = \log 2^{AV1} \ldots \quad (34)$$

$$AVo = AV10 + SVo \ldots \quad (35)$$

These are contents of the computation in this step. The computation carried out in the step 305 is expressed by the formulae (20) and (21). In the formulae (22), (23) and (24), it is judged whether the shutter speed is adequate or not. To be more specific, if the shutter speed derived from a relation between the preset value FNo and the measured value of ambient light is higher than the preset shutter speed, the ambient light is enough to create an over-exposure in the taking of a photograph at a combined value of the preset shutter speed and the value FNo. In such a case, the shutter speed sought by the expression (22) is replaced with the preset shutter speed, thereby automatically producing a situation necessary for the minimum flash light. From the value which is linearly set in the formulae (25) and (26) is subtracted the brightness under the ambient light, thus computing the quantity of light required for the flash light. The thus computed value is substituted by an APEX value in the formula (26). An amount of excess or shortage to the measured flash light is calculated in accordance with the formula (27). If the value GVo' with a decimal part is displayed, the value GVo may be displayed. In the exposure meter of this embodiment, however, the value GV is displayed in one stage pitch and hence correction is made in the formulae (29), (30) and (31). Let the integer of GVo' be GVo in the formula (28), and supposing that the decimal part of GVo' is not 0, GVo' ≠ GVo is established in terms of an expression. In such a case, when GVo is positive, the value GVo is incremented by one stage. Whereas if GVo is negative, there is no necessity for this value to be incremented by one stage, because the condition comes to the same by defining the integer of GVo' as GVo. When GVo' = -GVo, the decimal part of GVo' is 0, so that GVo may remain as it is.

Formulae (31), (32), (33), (34) and (35) by which to calculate the fraction of the preset value FNo after computing GVo are the same as the computation in the step 304. If GVo exceeds the display range, the GV MULTINO display becomes blank; and the signal for flickering the GV mark (j) is stored in the RAM (RAM5). Simultaneously, the flag UDF is set, as the measured light is too dark. Where GVo is less than the display range, GV MULTINO display (h) is blanked; and the signal for flickering the GV mark is stored in the RAM (RAM5). At the same time, the flag OVF is set, since the measured light is too bright. In case GVo falls within the display range, the flags OVF and UDF are reset, at which time the MULTI, ✓ mark (i) is indicated and the data for preventing the data MULTINO from being displayed are stored in the RAM (RAM4).

The flags UVF and UDF being set in this manner, proper values are displayed when the UP key (SW3) is turned ON in flickering the over mark (s) and when the DOWN-key (SW4) is turned ON in flickering the under mark (r).

In a step 308, the AV calculation of the step 304 is carried out with respect to the finally measured value. In a step 309, if the first memory is stored, the AV calculation is effected on the first memory. In a step 310, if the second memory is stored, the AV calculation is likewise effected on the second memory. If the FIX key (SW10) is turned ON, the data are stored in a FIX memory. In this case, the AV calculation is made with respect to the FIX memory in a step 311. Such being the case, however, the answer of the step 308 comes to AV1, and that of the step 309 amounts to AV2, the step 310 yields AV3 as its answer, and the step 311 produces AV4.

The program is then moved to a step F of FIG. 13. In a step 312, it is required to judge as to whether the data SHF is 0 or not. If it is 0, that is, when there is no calculation which is to be executed by turning ON any one of the keys (SW8), (SW9) and (SW10), the program is jumped to a step 313. In the step 313, a deviation from $AV_1$ on the basis of the finally measured value is computed with respect to AVo which is digitized. Similarly, in a step 314, if the first memory be present, a deviation from $AV_2$ on the basis of the first memory is computed. In a step 315, in case there exists the second memory, a deviation from $AV_3$ on the basis of the second memory is computed. The thus computed deviations are respectively expressed such as: $\Delta A_1, \Delta A_2, \Delta A_3$. These deviations $\Delta A_1, \Delta A_2, \Delta A_3$ are stored in the RAM (RAM11) for displaying analog dots, whereby the analog dots are lit up as a deviation from the digital value.

In the step 312, unless the data SHF is 0, it is necessary to judge as to whether it is 1 or not in a step 316. If the data SHF is 1, the program is jumped to a step 317 in which there is made a decision on whether two pieces of memories are stored by employing the data MN which indicates the number of memories. If stored, two pieces of the memories are compared with each other in a step 318. When the second memory is larger than the first one, a predetermined value BIASH is subtracted from $AV_3$ of the second memory in a step 319. In the step 318, if the first memory is greater than the second one, BIASH is subtracted from the first memory in a step 320. In the step 317, if two pieces of memories are, it is recognized, not stored, a step 321 necessitates judging as to whether a piece of memory is stored therein. If stored, the operation of the step 320 is carried out. Whereas if even a single piece of memory is not stored, in steps 322 and 323, the finally measured value serving as the first memory is stored. In a step 324, $AV_2$ is substituted by $AV_1$ with respect to the finally measured value. In a step 325, the data MN are arranged to be 1. Thereafter, the calculation of the step 320 is made.

Unless the data SHF are 1 in a step 316, there is made a decision on whether the data SHF are 2 or not in a step 326. If the data SHF are 2, the program is jumped to a step 327. A different point between the steps 327 to 335 and the steps 317 to 325 is that a predetermined value BIASS is added to $AV_2$ of the first memory smaller than the second memory in the step 330; and the value BIASS is added to AV3 of the second memory smaller than the first memory in the step 329. The descriptions of other steps are omitted, because the operations thereof are the same as those of the steps 317 to 325.

If the data SHF are not 2 in the step 326, the data SHF inevitably becomes 3. Hence, $AV_4$ of the FIX memory is substituted with AVo in a step 336. Then, in the steps 316 to 329, to the FNo value display is designated a value into which the value FNo is evolved by a given value (BIASH) with respect to the memory value having more brightness than that of the other memory or to the finally measured value, by turning ON of the H key (SW8). Subsequently, there is displayed a designation value for over-exposing the calculated value to a given degree, such designation value being fixed.

To the FNo value display is designated a value into which the value FNo is diaphragmed by a given value (BIASS) with respect to the memory value having more darkness than that of the other memory or to the finally measured value, by turning ON of the S key (SW9). Consequently, there is displayed a designation value for under-exposing the calculated value to a given degree, such designation value being fixed. Moreover, the FIX key (SW10) is turned ON and the measured value is thereby digital-displayed, more specifically, the measured value is fixed to the value FNo. The measured value after this is not displayed in the form of the digital display. Instead, such a value defined as $A_1$ of the step 313 is displayed as a deviation from the analog index 0 on the analog dots. Namely, the analog decoder (DC7) is constituted so that the value corresponding to AVo is invariably expressed in dot on the analog dots of the analog index 0. The first memory which is expressed as a deviation $\Delta A_2$ from AVo corresponding to the digital display (FNo value display) is likewise, as a deviation from the analog index 0, displayed in dot on the analog dots. Similarly, the second memory expressed as a deviation $\Delta A_3$ from AVo corresponding to the digital display (FNo value display) is, as a deviation from the analog index 0, displayed in dot on the analog dots.

In the above-described embodiment, the H key (SW8), the S key (SW9), the FIX key (SE10) are turned ON thereby to fix the calculated value on the digital display. The measured value after this is, as a deviation from the value digital-displayed, displayed on the analog dots. Where the value which is calculated by turning ON the H key (SW8), the S key (SW9), the FIX key (SW10) is fixed as an exposure value of a camera, on viewing the analog dots, it is, with the above-described process, feasible to comprehend how the measured values at the individual points in the object to be photographed are associated with the aforementioned fixed value, viz., it is possible to understand how the respective points in the object to be photographed are finished on the final image when taking a photograph of the subject to be photographed at the fixed value.

The measured value can be committed to memory by turning ON the MEMORY key (SW5). It is feasible to recognize how many memories are stored on seeing the lighting of the memory mark which corresponds to the number of stored memories. In calling the memory value of the RECALL key (SW6), it is possible to recognize what memory is now being invoked on viewing a flicker of the memory mark corresponding to the called memory.

It is practicable to procure a constitution by employing a single switch member instead of using two switches, this being actualized by providing the MULTI RESET key (SW11) outside the position MULTI of the SINGLE/MULTI switch (SW14).

By virtue of turn-ON of the RECALL key (SW6), there is no probability for the data held in the microcomputer (CPU) to be broken or modified and hence it is possible to make the RECALL key (SW6) serve a double purpose, that is, it is used as an activation switch for lighting up the display illumination member (LED) which illuminates the display elements (LCD).

According to this embodiment, upon an execution of measurement, the digital display alone which is displayed as the measured value becomes blank momentarily; and other displays corresponding to the set data continue to be displayed in spite of the measuring operation. By dint of such a display operation performed at the measurement, it is possible to readily confirm the measurement and to facilitate an observation of the measured data.

In the NON.C measurement mode according to this embodiment, the measurement is updated every time the emitted flash light falls on the exposure meter of this embodiment within a given period of time by creating a light standby state once. Consequently, there is no necessity to produce the light standby state by employing the measurement button or the like at every measurement. In addition, it is feasible to easily recognize whether or not the exposure meter of this embodiment is in the light standby state by flickering the NON.C mark in the display element (LCD). Furthermore, in this embodiment, the shutter speed and the value FNo are predeterminately set, and when taking a photograph with a combination of these exposures, there is programmed the arithmetic for computing a brightness of flash light which is necessary for obtaining a proper exposure. The value FNo is fixed from relations with a depth of field to be photographed and with other similar factors, and when taking a photograph by use of the flash light, the required value FNo has heretofore been obtained by repeating the measurement while varying a quantity of the flash light. The exposure meter of this embodiment, however, is capable of designating an amount of the flash light by one measurement.

In the exposure meter of this embodiment is programmed the arithmetic for computing the number of exposures necessary for obtaining a proper exposure at both the predetermined shutter speed and the preset value FNo. According to a conventional method, the number of integrations, viz., the number of exposures is sought by repeating the arithmetic measurement till a necessary value FNo is obtained. In this embodiment, however, it is possible to calculate a required number of exposures by one measurement and to display the result.

In the above-described embodiment, the memory mark 1 (p) and the memory mark 2 (q) are replaced with numerals (1) and (2), respectively; and at the same time, in the step 86 of the flow chart of FIG. 8, there may be effected (Lighting of the memory mark 2) and (Extinction of the memory mark 1) as well. Thanks to this process, it is feasible to display the number of stored light measurement values in numeral. In such a case, as in the case of step 105 or 106 of FIG. 8, the marks (numerals) corresponding to the recalled memory values may be flickered. The constitution may be diversified such that: the numerals alone which correspond to the recalled memory values are consecutively displayed; the number of memories is displayed by employing 7-segment display; and the number of memories comes to three or more.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

TABLE 1

| SW14 | SINGLE | | | | | | MULTI | | | | | |
|---|---|---|---|---|---|---|---|---|---|---|---|---|
| SW13 | TIME | | | FNo | | | TIME | | | FNo | | |
| SW12 | AMBI | CORD | NON.C | AMBI | CORD | NON.C | AMBI | CORD | NON.C | AMBI | CORD | NON.C |
| Calculated | AV0 | | | TV0 | | | GV0 | | | MULTINO & AV0 | | MULTINO |
| Display driver address | FNo display address (A6) | | | TIME display address (A5) | | | GV MULTINO display address (A7) | | | GV MULTINO display address (A7) & FNo display address (a5) | | GV MULTINO display address (A7) |
| Calculated corresponding display | FNo display | | | TIME display | | | GV MULTINO display | | | GV MULTINO & FNo display | | GV MULTINO display |

What is claimed is:

1. A light measuring device comprising:
   means for measuring light incident on a light measurement device to produce a light measuring signal;
   means for obtaining an ambient light intensity data in response to the light measuring signal without the influence of flash light;
   first means for calculating the quantity of flash light based on the light measuring signal with the influence of the flash light and the ambient light intensity data to produce a flash light quantity data;
   first means for setting a shutter speed;
   second means for setting an apparatus value;
   second means for calculating a deviation data corresponding to a deviation of an actual exposure amount from a necessary exposure amount in accordance with the ambient light intensity data, the set shutter speed and the set aperture value;
   third means for calculating a calculated data corresponding to a ratio between the deviation data and the flash light quantity data; and
   means for displaying a value corresponding to the calculated data.

2. A light measuring device as claimed in claim 1, wherein the third calculating means includes means for calculating a logarithmic value of the ratio.

3. A light measuring device as claimed in claim 1, further comprising means for shifting the set shutter speed towards a high speed side until the ambient light component is less than the exposure data, when the ambient light component is larger than the exposure data.

4. A light measuring device as claimed in claim 1 wherein the means for displaying includes a liquid crystal display device.

5. A light measuring device comprising:
   first means for obtaining the intensity of an ambient light to produce an ambient light intensity data;
   second means for obtaining the quantity of a flash light to produce a flash light quantity data;
   first means for setting a shutter speed to produce a shutter speed data;
   second means for setting an aperture value to produce an aperture value data;
   first means for calculating a deviation data corresponding to a deviation of an actual exposure amount from a necessary exposure amount in accordance with the ambient light intensity data, the shutter speed data and the aperture value data, and
   second means for calculating a resultant data corresponding to a ratio of the flash light quantity data to the deviation data.

6. A light measuring device as claimed in claim 5, wherein the second calculating means includes means for calculating a logarithmic value of the ratio.

7. A light measuring device as claimed in claim 5, further comprising means for shifting the set shutter speed towards a higher speed side until the actual exposure amount is less than the proper exposure amount, when the actual exposure amount is larger than the proper exposure amount.

8. A light measuring device as claimed in claim 5, wherein the second obtaining means includes means for obtaining a logarithmic value of the quantity of a flash light and the first calculating means includes means for calculating a logarithmic value of the deviation data, and wherein the second calculating means includes means for calculating the difference between the logarithmic value of the quantity of the flash light and the logarithmic value of the deviation data.

9. A light measuring device as claimed in claim 5, further comprising means for displaying the resultant data.

* * * * *

UNITED STATES PATENT AND TRADEMARK OFFICE
CERTIFICATE OF CORRECTION

PATENT NO. : 4,914,468

DATED : April 3, 1990

INVENTOR(S) : Naruse et al

It is certified that error appears in the above-identified patent and that said Letters Patent is hereby corrected as shown below:

Column 27, line 63, Claim 1, "apparatus" should read --aperture--

Column 28, lines 9-14, Claim 3 should be cancelled.

Signed and Sealed this

Eleventh Day of June, 1991

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,914,468

DATED : April 3, 1990

INVENTOR(S) : Kazuhiko Naruse

It is certified that error appears in the above-identified patent and that said Letters Patent is hereby corrected as shown below:

Claim 1, line 13, delete "apparatus" and insert --aperture--.

Signed and Sealed this

Thirteenth Day of August, 1991

Attest:

HARRY F. MANBECK, JR.

*Attesting Officer*      *Commissioner of Patents and Trademarks*